(12) United States Patent
Suzuki et al.

(10) Patent No.: US 11,585,562 B2
(45) Date of Patent: Feb. 21, 2023

(54) AIR PROCESSING DEVICE

(71) Applicant: DAIKIN INDUSTRIES, LTD., Osaka (JP)

(72) Inventors: Takanori Suzuki, Osaka (JP); Youichi Handa, Osaka (JP); Keita Kitagawa, Osaka (JP); Masaya Nishimura, Osaka (JP); Yoshiteru Nouchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 469 days.

(21) Appl. No.: 16/639,847

(22) PCT Filed: Jun. 27, 2018

(86) PCT No.: PCT/JP2018/024390
§ 371 (c)(1),
(2) Date: Feb. 18, 2020

(87) PCT Pub. No.: WO2019/044145
PCT Pub. Date: Mar. 7, 2019

(65) Prior Publication Data
US 2021/0131690 A1 May 6, 2021

(30) Foreign Application Priority Data
Aug. 28, 2017 (JP) .............................. JP2017-163414

(51) Int. Cl.
*F24F 11/89* (2018.01)
*F24F 11/38* (2018.01)
(Continued)

(52) U.S. Cl.
CPC ............ *F24F 11/89* (2018.01); *F24F 1/0073* (2019.02); *F24F 11/30* (2018.01); *F24F 11/38* (2018.01);
(Continued)

(58) Field of Classification Search
CPC .. F24F 11/89; F24F 11/30; F24F 1/546; F24F 1/0073; F24F 2013/227; F24F 13/20; G05B 15/02; H04N 7/183; H04H 5/2252
See application file for complete search history.

(56) References Cited

U.S. PATENT DOCUMENTS 3,280,577 A * 10/1966 Kobayashi ............... F25D 21/02
62/126
4,074,987 A * 2/1978 Krulewich ............... F25D 21/02
62/128
(Continued)

FOREIGN PATENT DOCUMENTS

CA 2797041 A1 5/2014
CN 202253971 U 5/2012
(Continued)

OTHER PUBLICATIONS

Extended European Search Report, dated Jul. 16, 2020, for European Application No. 18851817.9.
(Continued)

*Primary Examiner* — Emmanuel E Duke
(74) *Attorney, Agent, or Firm* — Birch, Stewart, Kolasch & Birch, LLP

(57) ABSTRACT

A body of a casing is provided with a predetermined component. An imaging device includes an attachment portion detachably attached to the component so as to be at a position at which the imaging device can image the at least one predetermined object to be imaged.

13 Claims, 18 Drawing Sheets

(51) Int. Cl.

| | | |
|---|---|---|
| *F24F 11/49* | (2018.01) | |
| *F24F 11/30* | (2018.01) | |
| *F24F 11/56* | (2018.01) | |
| *F24F 1/0073* | (2019.01) | |
| *G05B 15/02* | (2006.01) | |
| *H04N 7/18* | (2006.01) | |
| *F24F 13/22* | (2006.01) | |
| *H04N 5/225* | (2006.01) | |

(52) U.S. Cl.
CPC .............. *F24F 11/49* (2018.01); *F24F 11/56* (2018.01); *G05B 15/02* (2013.01); *H04N 7/183* (2013.01); *F24F 2013/227* (2013.01); *H04N 5/2252* (2013.01); *H04N 5/2253* (2013.01)

(56) References Cited

U.S. PATENT DOCUMENTS

| | | | | |
|---|---|---|---|---|
| 4,578,959 | A | * | 4/1986 | Alsenz .................... F25D 21/02 250/340 |
| 4,688,626 | A | | 8/1987 | Tengesdal |
| 4,831,833 | A | * | 5/1989 | Duenes ................... F25D 21/02 62/158 |
| 5,664,750 | A | * | 9/1997 | Cohen ................. F16M 11/041 248/231.71 |
| 5,965,814 | A | * | 10/1999 | French .................... G01F 23/00 307/118 |
| 2008/0047329 | A1 | * | 2/2008 | Breed .............. G01N 35/00871 73/61.41 |
| 2009/0229784 | A1 | * | 9/2009 | Rohr ....................... G01B 11/22 165/301 |
| 2010/0286801 | A1 | | 11/2010 | Yum et al. |
| 2016/0047587 | A1 | | 2/2016 | Sasaki et al. |
| 2018/0050229 | A1 | * | 2/2018 | Abernathy ............... A62C 2/14 |

FOREIGN PATENT DOCUMENTS

| | | | |
|---|---|---|---|
| CN | 104596051 A | | 5/2015 |
| CN | 105074366 A | | 11/2015 |
| CN | 106871253 A | | 6/2017 |
| CN | 107036389 A | | 8/2017 |
| DE | 102015203704 A1 | * | 9/2016 ............. G03B 43/00 |
| EP | 3128774 A1 | | 2/2017 |
| JP | 7-198156 A | | 8/1995 |
| JP | 11-54265 A | | 2/1999 |
| JP | 2002-267989 A | | 9/2002 |
| JP | 2005-197789 A | | 7/2005 |
| JP | 2007-46864 A | | 2/2007 |
| JP | 2007-255840 A | | 10/2007 |
| JP | 2008-232605 A | | 10/2008 |
| JP | 2008232605 A | * | 10/2008 |
| JP | 2011-27328 A | | 2/2011 |
| JP | 2012-32071 A | | 2/2012 |
| JP | 2014-31957 A | | 2/2014 |
| JP | 2014-239394 A | | 12/2014 |
| JP | 2015-111025 A | | 6/2015 |
| JP | 2015-124976 A | | 7/2015 |
| JP | 2015124976 A | * | 7/2015 ............. F24F 1/0007 |
| JP | 2016-30478 A | | 3/2016 |
| JP | 2016-42835 A | | 4/2016 |
| JP | 2017053783 A | * | 3/2017 |
| JP | 2017-121201 A | | 7/2017 |
| JP | 2017-141967 A | | 8/2017 |
| WO | WO 2017/023205 A1 | | 2/2017 |

OTHER PUBLICATIONS

Extended European Search Report, dated Jul. 20, 2020, for European Application No. 18851708.0.
Extended European Search Report for European Application No. 21198633.2, dated Dec. 23, 2021.
International Search Report, issued in PCT/JP2018/024387, PCT/ISA/210, dated Oct. 2, 2018.
International Search Report, issued in PCT/JP2018/024390, PCT/ISA/210, dated Sep. 18, 2018.
Written Opinion of the International Searching Authority, issued in PCT/JP2018/024390, PCT/ISA/237, dated Sep. 18, 2018.
U.S. Office Action for U.S. Appl. No. 16/639,940, dated Apr. 8, 2022.
U.S. Office Action for U.S. Appl. No. 16/639,940, dated Aug. 1, 2022.

* cited by examiner

AIR PROCESSING DEVICE

TECHNICAL FIELD

The present invention relates to an air processing device.

BACKGROUND ART

An air processing device such as an air-conditioning device has been widely known in the art. Patent Document 1 discloses a technique for acquiring image data of a predetermined object to be imaged inside a casing of an air-conditioning device.

The air-conditioning device of Patent Document 1 includes a camera (an imaging device) installed inside a casing of an indoor unit. The camera is positioned such that a target object (such as a filter) can be imaged. Image data of the target object imaged by the camera is output to a centralized monitor via a LAN. A service provider or any other operator can check the image data transmitted to the central monitor to determine the state of the target object (e.g., clogging and breakage of the filter, and how the filter is installed).

CITATION LIST

Patent Documents

Patent Document 1: Japanese Unexamined Patent Publication No. 2007-46864

SUMMARY OF THE INVENTION

Technical Problem

In the air processing device described above, in order to acquire image data of an object to be imaged by a camera, it is necessary to install the camera to a predetermined place in the casing. However, no consideration has been given to the attachment of a camera in Patent Document 1.

An object of the present disclosure is to propose an air processing device including an imaging device that can be easily installed in a casing.

Solution to the Problem

The first aspect is directed to an air processing device including: a casing (20); and an imaging device (70) that acquires image data of at least one predetermined object (40, 43, 45, 60, 66) to be imaged positioned in the casing (20), wherein a body (20a) of the casing (20) is provided with a predetermined component (47, 49), and the imaging device (70) includes an attachment portion (52) detachably attached to the component (47, 49) so as to be at a position at which the imaging device (70) can image the at least one predetermined object (40, 43, 45, 60, 66) to be imaged.

The imaging device (70) of the first aspect is attached to a predetermined component (47, 49) via the attachment portion (52). The attachment portion (52) is attached to and detached from the component (47, 49). This allows the operation of attaching the imaging device (70) to be simplified.

The second aspect according to the first aspect is directed to an air processing device, wherein the attachment portion (52) includes: a pair of clamping members (53) that are opposed to each other so as to clamp the component (47, 49); and a pressing member (55) for pressing the clamping members (53) so as to reduce a gap between the pair of clamping members (53).

In the second aspect, with the component (47, 49) sandwiched between the pair of clamping members (53), these clamping members (53) are pressed by the pressing member (55). This allows the operation of attaching the imaging device (70) to be simplified.

The third aspect according to the first or second aspect is directed to an air processing device wherein a wireless communication section (77) that wirelessly transmits image data acquired by the imaging device (70) to the outside of the casing (20).

In the third aspect, image data acquired by the imaging device (70) is transmitted outside the casing (20) by the wireless communication section (77). It is thus not necessary to route an image data transmission wire from the inside of the casing (20) to the outside.

The fourth aspect according to any one of the first to third aspects is directed to an air processing device further including: a transmission line (91) that transmits image data acquired by the imaging device (70) to the outside of a casing (20) in a wired manner; and a wireless communication section (77) that wirelessly transmits output data from the transmission line (91) to a predetermined receiver (80), the wireless communication section (77) being disposed outside the casing (20).

In the fourth aspect, image data acquired by the imaging device (70) is transmitted outside the casing (20) via the transmission line (91). Then, the image data is transmitted to the receiver (80) by the wireless communication section (77) outside the casing (20). When the wireless communication section (77) is provided in the casing (20), the transmission of image data from the inside of the casing (20) to the outside may be prevented by the casing (20). In contrast, in the present invention, image data is transmitted to the outside of the casing (20) in a wired manner, and this image data is thereafter wirelessly transmitted to the receiver (80). The image data thus can be reliably transmitted to the receiver (80).

The fifth aspect according to any one of the first to fourth aspects is directed to an air processing device further including: a wire (56) one end of which is connected to the imaging device (70) and that extends to the outside of the casing (20), wherein the other end of the wire (56) is provided with a connector (56a) coupled with external wire (86).

In the fifth aspect, the wire (56) connected to the imaging device (70) is provided outside the casing (20) and is coupled with the external wire (86) via the connector (56a). This allows the operation of wiring the imaging device (70) to be simplified.

The sixth aspect according to any one of the first to fifth aspects is directed to an air processing device, wherein the imaging device (70) includes a wide-angle or fisheye lens (71).

In the sixth aspect, the imaging device (70) images the objects (40, 43, 45, 60, 66) to be imaged with a wide-angle or fisheye lens (71). Accordingly, the angle of view and the imaging area of the imaging device (70) are increased.

The seventh aspect according to any one of the first to sixth aspects is directed to an air processing device, wherein the imaging device (70) includes a lens (71) and a light source (72) located rearward of the lens (71) in the imaging direction.

In the seventh aspect, the light source (72) is located behind the lens (71). This avoids the light source (72) to enter the imaging area of the imaging device (70).

The eighth aspect according to any one of the first to seventh aspects is directed to an air processing device, wherein the at least one predetermined object (40, 43, 45, 60, 66) to be imaged includes at least one of a drain pan (60), a drain port, a drain pump (66), a float switch, or a humidifying element (45).

In the eighth aspect, the imaging device (70) acquires image data of at least one of a drain pan (60), a drain port, a drain pump (66), a float switch, or a humidifying element (45). Accordingly, on the basis of this image data, the dirt and growth of bacteria and fungi in the drain pan (60), the contamination and clogging of the drain port, the breakage of the drain pump (66), and the dirt, growth of bacteria and fungi, and breakage of the humidifying element (45) can be checked.

The ninth aspect according to any one of the first to eighth aspects is directed to an air processing device, wherein the component (47, 49) is a pipe (47, 49).

In the ninth aspect, the attachment portion (52) is detachably attached to the pipe (47, 49), which is a component. That is, the pipe (47,49) functions as a part for supporting the imaging device (70).

The tenth aspect according to any one of the first to ninth aspects is directed to an air processing device, wherein the imaging device (70) is disposed at a position at which air at a flow velocity that is 30% of an average flow velocity Va of air blown out of the casing (20) flows.

In the tenth aspect, the flow velocity of air at a position at which the imaging device (70) is disposed is relatively low. Accordingly, the dirt on the lens of the imaging device (70) by adhesion of dust and the like in the air can be reduced.

In the eleventh aspect according to any one of the first to tenth aspects, the lens (71) of the imaging device (70) faces downstream of the air flow.

In the eleventh aspect, the lens (71) of the imaging device (70) faces downstream of the air flow. Accordingly, the dirt on the lens (71) by adhesion of dust and the like in the air can be substantially prevented.

Advantages of the Invention

In these aspects, the imaging device (70) can be attached to the component (47, 49) provided in the body (20*a*) of the casing (20) via the attachment portion (52). This allows the operation of installing the imaging device (70) to be simplified. The component (47, 49) functions as a member for supporting the imaging device (70). This allows the number of parts to be reduced.

DESCRIPTION OF EMBODIMENTS

Embodiments of the present disclosure are described below with reference to the drawings. The embodiments below are merely exemplary ones in nature, and are not intended to limit the scope, applications, or use of the present invention.

First Embodiment

An air processing device according to the first embodiment is an air-conditioning device (10). The air-conditioning device (10) adjusts at least the temperature of air. Specifically, the air-conditioning device (10) adjusts the temperature of room air (RA), and supplies the temperature-adjusted air as supply air (SA) into the room. The air-conditioning device (10) includes an indoor unit (11) installed in a space in the ceiling cavity. The indoor unit (11) is connected to an outdoor unit (not shown) through refrigerant pipes. Thus, the air-conditioning device (10) forms a refrigerant circuit. The refrigerant circuit is filled with a refrigerant that circulates to perform a vapor compression refrigeration cycle. The outdoor unit is provided with a compressor and an outdoor heat exchanger that are connected to the refrigerant circuit, and an outdoor fan that corresponds to the outdoor heat exchanger.

<Indoor Unit>

Figure 1:
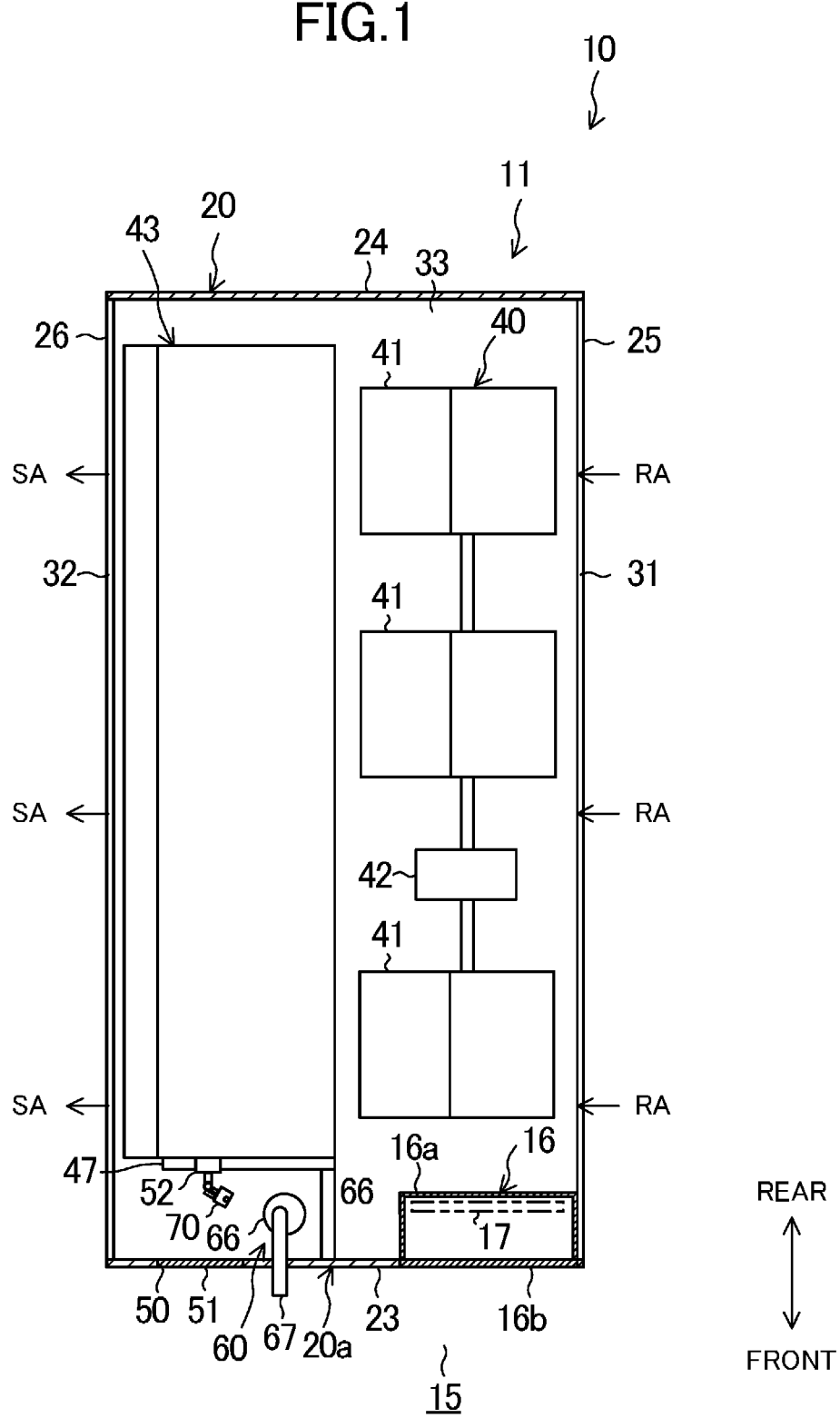
FIG. 1 is a plan view illustrating an internal structure of an air-conditioning device according to the first embodiment.
Figure 2:
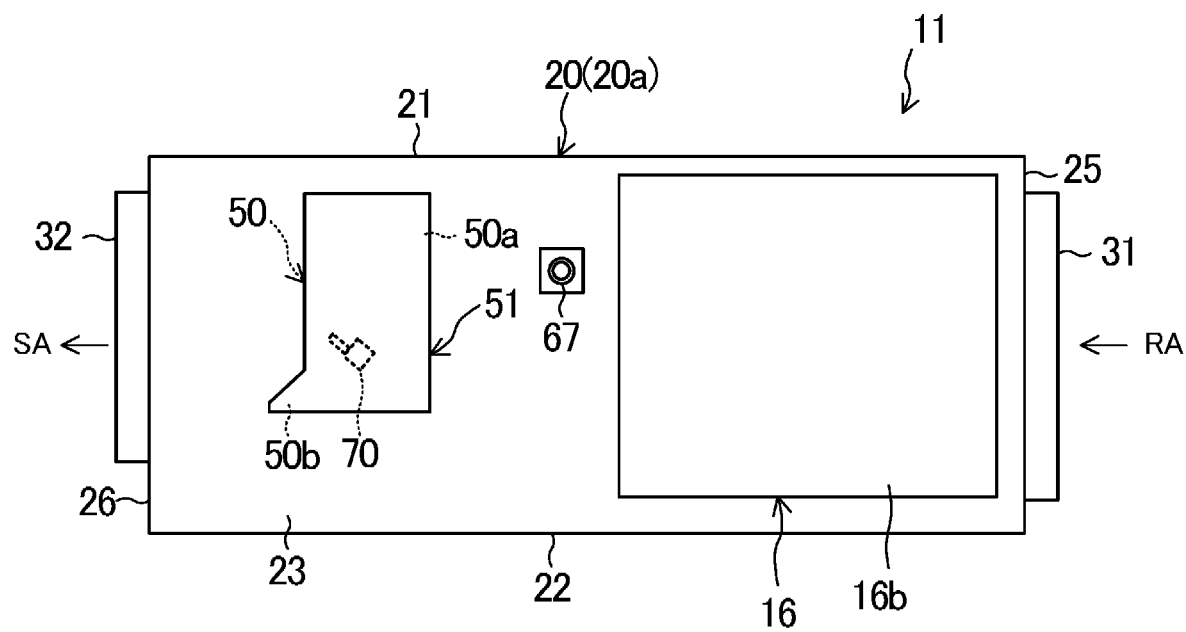
FIG. 2 is a plan view illustrating the air-conditioning device according to the first embodiment.
Figure 3:
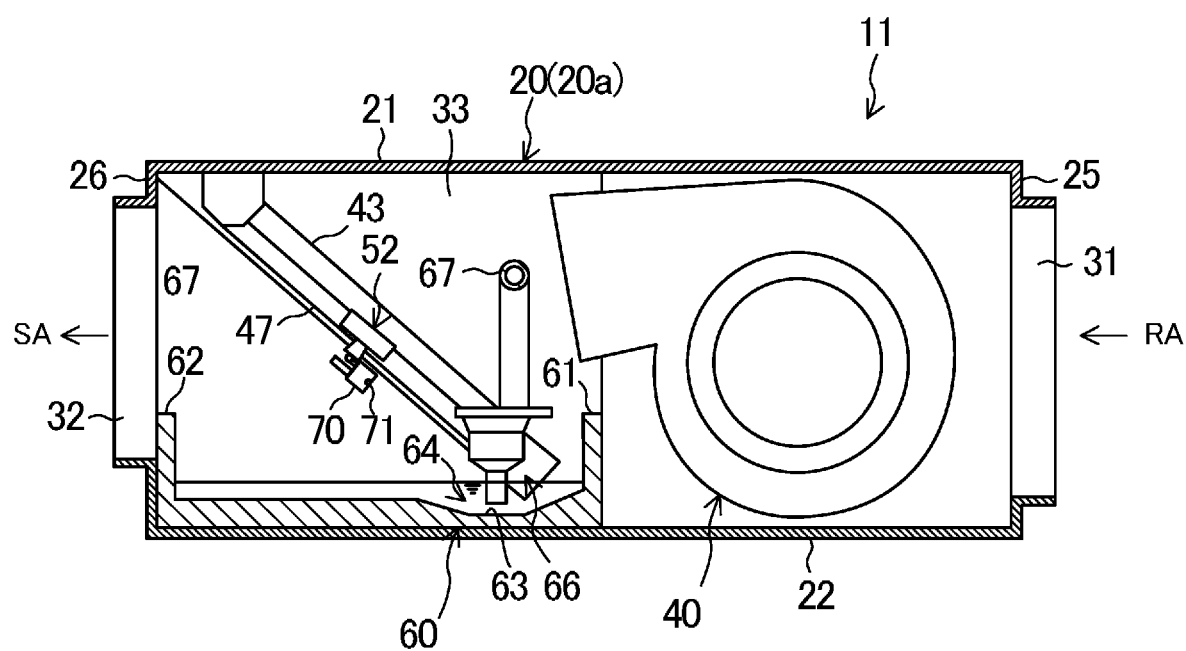
FIG. 3 is a longitudinal cross-sectional view illustrating an internal structure of the air-conditioning device according to the first embodiment.

As illustrated in FIGS. 1 to 3, the indoor unit (11) includes a casing (20) installed in the ceiling cavity, and a fan (40) and an indoor heat exchanger (43) both housed in the casing (20). The casing (20) includes therein a drain pan (60) collecting condensed water generated from air in the casing (20), and a drain pump (66) for discharging water accumulated in the drain pan (60).

<Casing>

The casing (20) has the shape of a rectangular parallelepiped hollow box. The casing (20) includes a top plate (21), a bottom plate (22), and four side plates (23, 24, 25, 26). The four side plates include a front panel (23), a rear panel (24), a first side panel (25), and a second side panel (26). The front and rear panels (23) and (24) face each other. The first and second side panels (25) and (26) face each other.

The front panel (23) faces a maintenance space (15). The front panel (23) is provided with an electric component box (16), an inspection hole (50), and an inspection cover (51). The first side panel (25) has an suction port (31). A suction duct (not shown) is connected to the suction port (31). The inlet end of the suction duct communicates with an indoor space.

The second side panel (26) has a blow-out port (32). A blow-out duct (not shown) is connected to the blow-out port (32). The blow-out end of the exhaust duct is connected to the indoor space. The casing (20) has therein an air flow path (33) between the suction port (31) and the blow-out port (32).

<Fan>

The fan (40) is disposed in a portion of the air flow path (33) near the first side panel (25). The fan (40) transfers air in the air flow path (33). In this embodiment, three sirocco fans (41) are driven by one motor (42) (see FIG. 1).

<Indoor Heat Exchanger>

The indoor heat exchanger (43) is disposed in a portion of the air flow path (33) near the second side panel (26). The indoor heat exchanger (43) is configured as, for example, a fin-and-tube heat exchanger. The indoor heat exchanger (43) of this embodiment is arranged obliquely. The indoor heat exchanger (43) serving as an evaporator constitutes a cooling portion that cools air.

As illustrated in FIG. 3, a header collecting pipe (47) which is a pipe (strictly a refrigerant pipe) is provided in front of the indoor heat exchanger (43). The header collecting pipe (47) obliquely extends along the side edge of the indoor heat exchanger (43). The header collecting pipe (47) is connected to a heat transfer tube of the indoor heat exchanger (43) through a branch pipe (not shown).

<Drain Pan>

As schematically illustrated in FIG. 3, the drain pan (60) is disposed under the indoor heat exchanger (43) to extend along the bottom plate (22). The drain pan (60) includes a first side wall (61), a second side wall (62), and a bottom portion (63). The first side wall (61) is located upstream of the indoor heat exchanger (43). The second side wall (62) is located downstream of the indoor heat exchanger (43). The bottom portion (63) extends from the first side wall (61) to the second side wall (62). The bottom portion (63) has a concave portion (64) having a substantially trapezoidal cross section near the center of the bottom portion (63). In the drain pan (60), the bottom surface of the concave portion (64) is lowest in height. In other words, the concave portion (64) includes the deepest point of the drain pan (60).

<Drain Pump>

A drain pump (66) is disposed inside the drain pan (60). Specifically, a suction portion (66*a*) of the drain pump (66) is disposed inside the concave portion (64) of the drain pan (60). A discharge port of the drain pump (66) is connected to the inlet end of a drain pipe (67). The drain pipe (67) passes through the front panel (23) of the casing (20) in a horizontal direction. When the drain pump (66) starts operating, condensed water accumulated in the drain pan (60) is pumped up. The water pumped up is discharged to the outside of the casing (20) through the drain pipe (67).

<Electric Component Box>

As illustrated in FIG. 1, the electric component box (16) is disposed on a portion of the front panel (23) near the fan (40). The electric component box (16) houses therein a printed board (17) on which a power supply circuit, a control circuit, and any other circuit are mounted, wires respectively connected to the circuits, a high-voltage power source, a low-voltage power source, and other components. The electric component box (16) includes a box body (16*a*) having a front surface with an opening, and an electric component cover (16*b*) opening and closing the opening surface of the box body (16*a*). The electric component cover (16*b*) forms a portion of the front panel (23). Detaching the electric component cover (16*b*) allows the inside of the electric component box (16) to be exposed to the maintenance space (15).

<Inspection hole and Inspection Cover>

Figure 4:
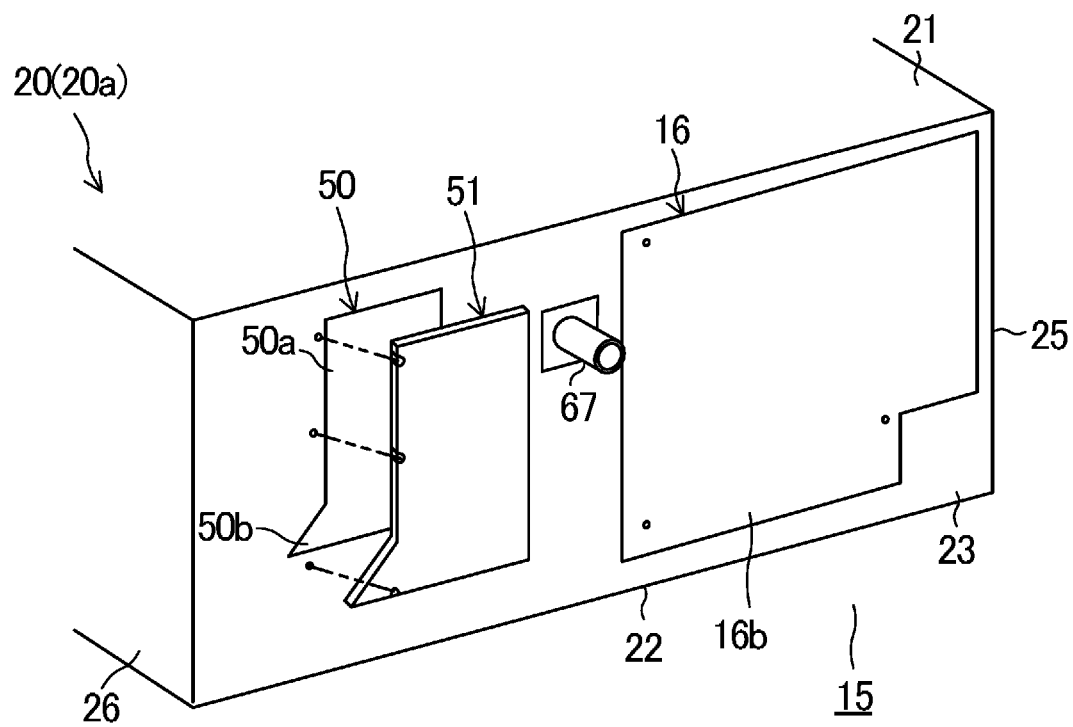
FIG. 4 is a perspective view illustrating a schematic configuration of the air-conditioning device according to the first embodiment on the front panel side.

As illustrated in FIG. 1, the inspection hole (50) is disposed in a portion of the front panel (23) near the indoor heat exchanger (43). As illustrated in FIGS. 2 and 4, the inspection hole (50) includes a rectangular portion (50*a*), and a triangular portion (50*b*) that is continuous with one lower corner of the rectangular portion. The triangular portion (50*b*) protrudes from the rectangular portion (50*a*) toward the second side panel (26). The inspection hole (50) is formed at a position corresponding to the drain pan (60). Detaching the inspection cover (51) from the inspection hole (50) allows the inside of the drain pan (60) to be inspected from the maintenance space (15).

The inspection cover (51) has a shape substantially similar to that of the inspection hole (50), and is slightly larger than the inspection hole (50). The inspection cover (51) has an edge portion having a plurality of (three in this example) fastening holes through which the inspection cover (51) is attached to the casing body (20*a*). The inspection cover (51) is fixed to the casing body (20*a*) through a plurality of fastening members (for example, bolts) inserted into, and run through, the fastening holes. Such a configuration allows the inspection cover (51) to be detachably attached to the casing body (20*a*) to open and close the inspection hole (50).

<Attachment Portion and Camera>

Figure 5:
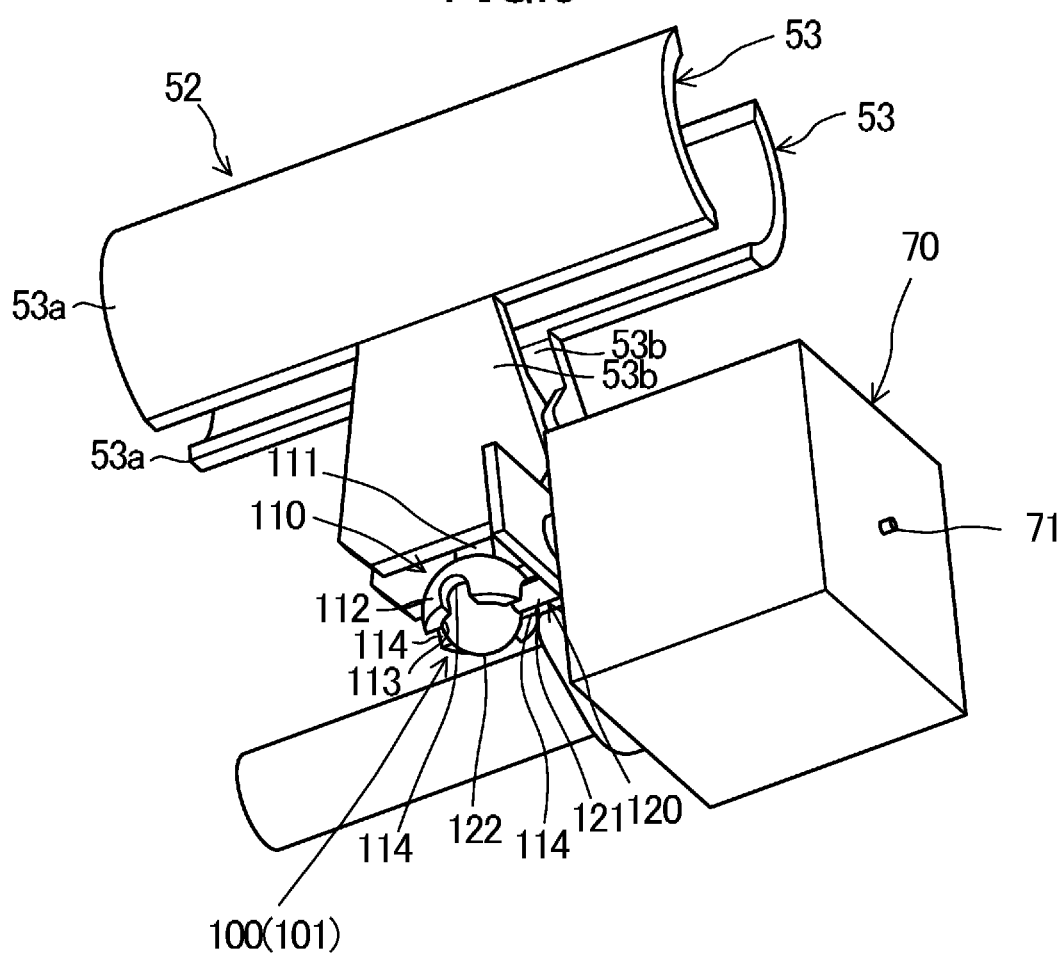
FIG. 5 is a perspective view illustrating the structure of an imaging unit according to the first embodiment.

As illustrated in FIG. 5, an imaging system (S) includes an imaging unit which includes a camera (70) as an imaging device, an adjustment mechanism (100), and an attachment portion (52). The camera (70) of this embodiment is attached to the header collecting pipe (47), which is a component, via an attachment portion (52) (The details will be described below).

The camera (70) constitutes an imaging device for imaging the target drain pan (60) to acquire image data. The camera (70) includes a lens (71) and a light source (flash). The lens (71) is configured as a super-wide-angle lens, for example.

The adjustment mechanism (100) includes a ball joint (101). The ball joint (101) includes a first joint (110) fixed to the attachment portion (52) and a second joint (120) fixed to the camera (70).

The first joint (110) includes a rod (111) and a socket (112) provided at the tip of the rod (111). The socket (112) has a shape in which a part of a hollow sphere is cut off, and a substantially spherical fitting concave portion (113) is formed inside thereof. A plurality of notch grooves (114) (four in this example) are formed on the peripheral portion of the open end of the fitting concave portion (113). The notch grooves (114) are arranged in the circumferential direction at equal spaces. The number of the notch grooves (114) is not limited to the number stated above, and the notch grooves (114) may also be omitted.

The second joint (120) includes a rotary shaft (121) coupled with the camera (70) and a ball (122) provided at the tip of the rotary shaft (121). The ball (122) fits into the fitting concave portion (113) of the socket (112). The ball (122) is held in the socket (112) in a spherical contact with the fitting concave portion (113). That is, the ball (122) is freely rotatable in the fitting concave portion (113). The rotary shaft (121) can tilt with the ball (122) and rotate about the center of the rotary shaft (121). Further, the rotary shaft (121) can engage with each notch groove (114) in the socket (112). The rotary shaft (121) can be positioned by engaging the rotary shaft (121) with the notch groove (114).

With this configuration, the camera (70) can turn 360° around the center of the rod (111), and can change the tilt angle with respect to the center of the rod (111). Accordingly, the imaging direction of the camera (70) can be adjusted, as appropriate, according to the position of the object to be imaged.

The attachment portion (52) of this example is a clip-type attachment portion. The attachment portion (52) includes a pair of clamping members (53) and an elastic member (for example, a spring (not shown)) which biases the clamping members (53) inward. Each clamping member (53) has a substantially rectangular projection plate (53a) and a grip (53b) supported by the edge of the projection plate (53a). A support shaft (not shown) for rotatably supporting the projection plates (53a) is provided on the base end of the pair of projection plates (53a). The grip (53b) has a substantially arc shape protruding toward outside. The pair of the grips (53b) are opposed to each other. The spring is disposed between the pair of clamping members (53). The spring is configured as a pressing member for pressing the clamping members (53) so as to reduce a gap between them.

<Imaging System>

An imaging system (S) according to this embodiment will be described with reference to FIG. 6. The imaging system (S) according to this embodiment includes the camera (70) described above, a power source (18), and a communication terminal (80).

The camera (70) is provided in a casing (20) of an indoor unit (11). The camera (70) includes an imaging control unit (74), a storage (75), an ID provider (76), a wireless communication section (77).

The imaging control unit (74) controls an imaging operation of the camera (70) in response to a command to capture an image input from outside. Specifically, in this embodiment, when a signal indicating the command to capture an image is input from the communication terminal (80) to the wireless communication section (77), the camera (70) images a target object. Thus, the camera (70) acquires image data of the object to be imaged (in this embodiment, the drain pan (60)). The imaging control unit (74) includes a microcomputer and a memory device (specifically, a semiconductor memory) that stores software for operating the microcomputer.

The storage (75) stores the acquired image data. The storage (75) includes various memory devices (semiconductor memories).

The ID provider (76) associates ID information corresponding to the image data with the corresponding image data. Examples of the ID information include the date and time of imaging, and the model and location of the air-conditioning device corresponding to the imaged drain pan (60). Thus, the storage (75) stores the image data including these pieces of the ID information.

The wireless communication section (77) is wirelessly connected to the communication terminal (80). The wireless communication section (77) constitutes a wireless transmitter. The wireless communication section (77) is configured as, for example, a wireless router. The wireless communication section (77) is connected to the communication terminal (80) around the air-conditioning device (10) via a wireless LAN. Thus, data can be exchanged between the camera (70) and the communication terminal (80). Specifically, the wireless communication section (77) wirelessly transmits the image data acquired by the camera (70) to the communication terminal (80). The wireless communication section (77) receives a command to capture an image from the communication terminal (80) (e.g., a service provider) as appropriate. The wireless communication section (77) may use a communication line of a mobile high-speed communication technology (for example, LTE).

The power source (18) is provided, for example, inside the electric component box (16) of the air-conditioning device (10). A power source line (85) of the camera (70) is led to the outside of the casing (20) through, for example, the inspection hole (50), and drawn into the electric component box (16) from the outside. Such wiring allows the camera (70) in the casing (20) and the power source (18) in the electric component box (16) to be connected together through the power line (85). Thus, electric power is supplied to the camera (70) from the power source (18). The power source (18) serves also as a power source for other components of the air-conditioning device (10).

The communication terminal (80) is configured as a smartphone, a tablet terminal, a mobile phone, a personal computer, or any other suitable device, which is connectable to a wireless LAN or any other suitable network. The communication terminal (80) includes a microcomputer, software for operating the microcomputer, a memory device serving as a storage, a receiver for receiving image data, and a sender for outputting a predetermined command.

The communication terminal (80) includes an operating unit (81) and a display (82). The service provider or any other operator operates predetermined application software using the operating unit (81), such as a keyboard or a touch panel. On the application software on the display (82), a command for making the camera (70) capture an image can be transmitted, and image data acquired by the camera (70) can be downloaded, for example.

—Operation—

A basic operation of the air-conditioning device (10) according to the first embodiment will be described with reference to FIGS. 1 and 3. The air-conditioning device (10) is configured to be capable of performing a cooling operation and a heating operation.

In the cooling operation, a refrigerant compressed by the compressor of the outdoor unit dissipates heat (condenses) in the outdoor heat exchanger, and is decompressed at an expansion valve. The decompressed refrigerant evaporates in the indoor heat exchanger (43) of the indoor unit (11), and is again compressed by the compressor.

When the fan (40) is operated, room air (RA) in the indoor space is sucked into the air flow path (33) through the suction port (31). The air in the air flow path (33) passes through the indoor heat exchanger (43). In the indoor heat exchanger (43), the refrigerant absorbs heat from the air, thereby cooling the air. The cooled air passes through the blow-out port (32), and is then supplied as supply air (SA) to the indoor space.

Here, if the air is cooled to a temperature equal to or lower than the dew point in the indoor heat exchanger (43), water in the air condenses. The condensed water thus generated is collected in the drain pan (60) as appropriate. The condensed water collected in the drain pan (60) is discharged to the outside of the casing (20) by the drain pump (66).

On the other hand, in the heating operation, a refrigerant compressed by the compressor of the outdoor unit dissipates heat (condenses) in the indoor heat exchanger (43) of the indoor unit (11), and is decompressed at an expansion valve. The decompressed refrigerant evaporates in the outdoor heat exchanger of the outdoor unit, and is again compressed by the compressor. Thus, in the indoor heat exchanger (43), the refrigerant dissipates heat to the air, thereby heating the air.

<Attachment of Camera>

The camera (70) of this embodiment is attached to the header collecting pipe (47) via the attachment portion (52). Specifically, when the inspection hole (50) is removed from the casing body (20a), the header collecting pipe (47) is exposed to the outside of the casing (20). The attachment portion (52) is attached to the header collecting pipe (47) in this state. When the header collecting pipe (47) is sandwiched between the pair of clamping members (53), the header collecting pipe (47) is held by the biased grips (53b). Accordingly, the camera (70) is supported by the header collecting pipe (47) via the attachment portion (52). In this state, the lens (71) of the camera (70) faces obliquely downward. Subsequently, the imaging direction of the camera (70) is slightly adjusted by the adjustment mechanism (100). This allows the drain pan (60) to be easily positioned in the imaging area of the camera (70).

<Checking of State of Drain Pan>

In this embodiment, the state of the drain pan (60) described above can be appropriately checked by the imaging system (S).

Specifically, in the attached state of the inspection cover (51), a lens (71) of the camera (70) is directed to the inside the drain pan (60). In this state, a service provider or any other operator operates the communication terminal (80) and inputs a command to capture an image on the application software. As a result, the command to capture an image is output from the communication terminal (80) to the camera (70). When the command to capture an image is input to the wireless communication section (77) of the camera (70), the imaging control unit (74) makes the camera (70) capture an image. During this imaging, a light source (72) starts operating to illuminate the inside of the drain pan (60). Such imaging allows the service provider or any other operator to acquire image data inside the drain pan (60) at the required timing.

The image data stored in the camera (70) in this manner are output to the communication terminal (80) together with the ID information. Thus, the service provider or any other operator can check the image data through the display (82), and can determine the state of the drain pan (60) as appropriate. Specifically, the service provider or any other operator can check the image data to determine the degrees of putrefaction, mold contamination, dirt contamination, and other types of contamination in the condensed water in the drain pan (60), the water level in the drain pan (60), whether or not the drain pipe (67) has been clogged, and whether or not the drain pump (66) has been broken.

—Advantages of First Embodiment—

The first embodiment allows image data of the inside of the drain pan (60) to be acquired by the camera (70). Thus, the service provider or any other operator can determine the state of the inside of the drain pan (60) without entering space in a ceiling cavity. The image data acquired by the camera (70) is wirelessly transmitted to the communication terminal (80) outside the casing (20). Therefore, the image data can be easily transmitted to the communication terminal (80) which is relatively distant from the camera (70) without providing any transmission line or the like.

As illustrated in FIG. 3, the camera (70) is attached to the header collecting pipe (47), which is a component, via an attachment portion (52). The attachment portion (52) can be easily attached to and detached from the header collecting pipe (47) by a pair of clamping members (53). This allows the camera (70) to be easily attached in the casing (20). Further, the header collecting pipe (47) functions as a support for the camera (70). This allows the number of parts to be reduced.

In this embodiment, the header collecting pipe (47), which is a component, is near the inspection hole (50). This allows the camera (70) to be attached from the outside of the casing (20).

The angle of the camera (70) in the imaging direction can be adjusted, as appropriate, by the adjustment mechanism (100). This allows the drain pan (60), which is an object to be imaged, to be easily positioned in an imaging area of the camera (70).

Second Embodiment

An air-conditioning device (10) according to a second embodiment has a basic configuration different from that according to the first embodiment. The air-conditioning device (10) according to the second embodiment takes in outdoor air (OA), and adjusts the temperature and humidity of air. The air-conditioning device (10) supplies the air thus treated as supply air (SA) into the room. That is to say, the air-conditioning device (10) is an outside air treatment system. The air-conditioning device (10) includes a humidifying element (45) for humidifying air, for example, in the winter season.

The air-conditioning device (10) is installed in a space in the ceiling cavity. Just like the first embodiment, the air-conditioning device (10) includes an outdoor unit (not shown) and an indoor unit (11), which are connected together through refrigerant pipes to form a refrigerant circuit.

<Indoor Unit>

Figure 7:
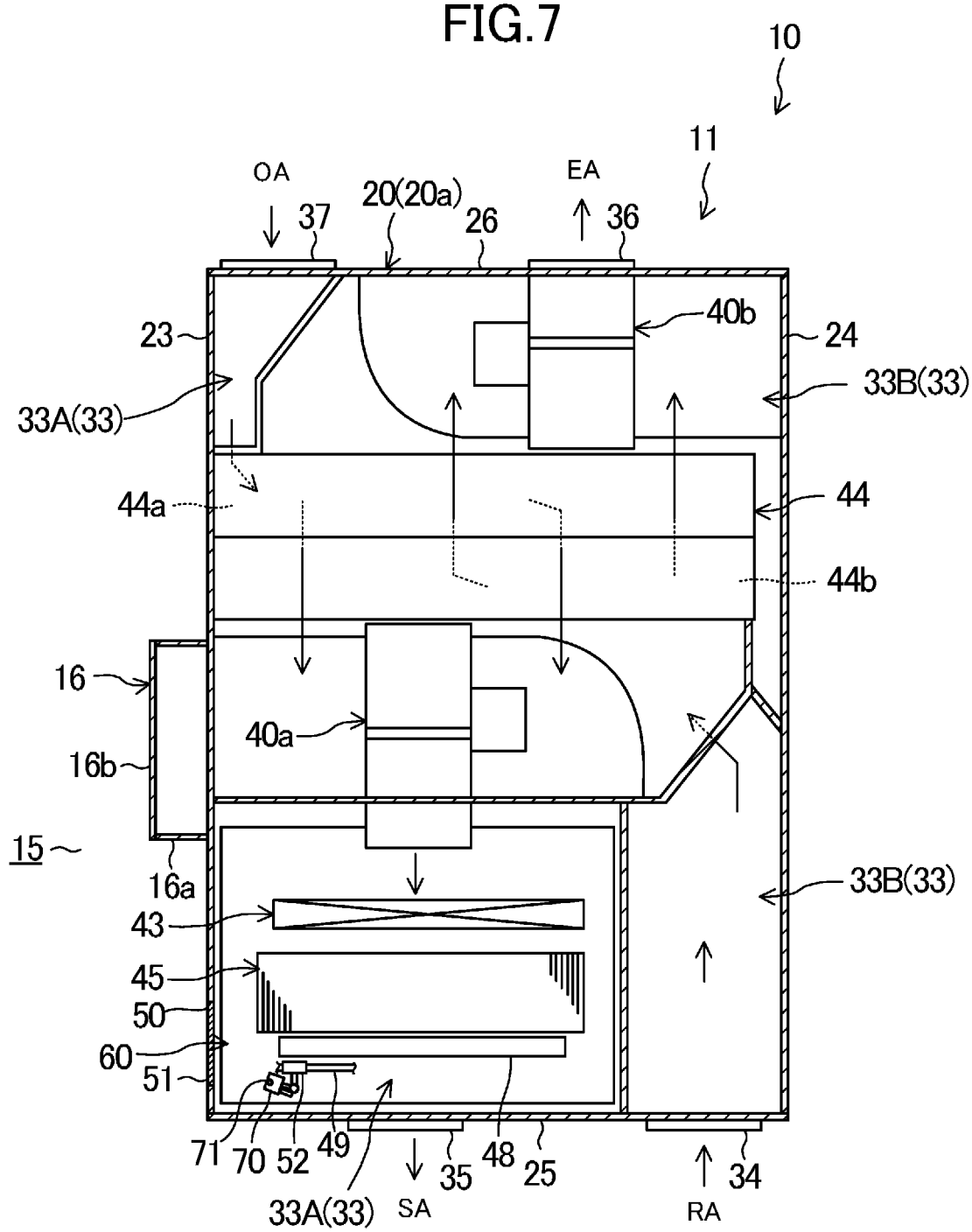
FIG. 7 is a plan view illustrating an internal structure of an air-conditioning device according to the second embodiment.
Figure 8:
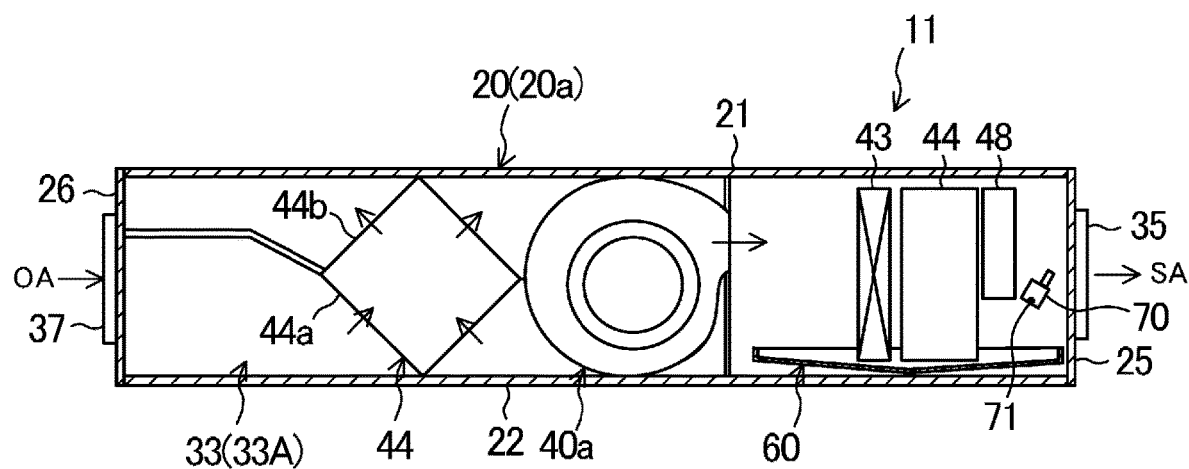
FIG. 8 is a cross-sectional view illustrating an internal structure of an air-conditioning device according to the second embodiment.

As illustrated in FIGS. 7 and 8, the indoor unit (11) includes a casing (20) installed in the ceiling cavity, an air supply fan (40a), an exhaust fan (40b), an indoor heat exchanger (43), a total heat exchanger (44), and the humidifying element (45). The casing (20) includes therein a drain pan (60) collecting condensed water generated in the indoor heat exchanger (43), and a drain port for discharging water accumulated in the drain pan (60).

<Casing>

The casing (20) has the shape of a rectangular parallelepiped hollow box. Just like the first embodiment, the casing

(20) of the second embodiment includes a top plate (21), a bottom plate (22), a front panel (23), a rear panel (24), a first side panel (25), and a second side panel (26).

The front panel (23) faces a maintenance space (15). The front panel (23) is provided with an electric component box (16), an inspection hole (50), and an inspection cover (51) (which will be described in detail below). The first side panel (25) has an inside air port (34) and an air supply port (35). The inside air port (34) is connected to an inside air duct (not shown). The inlet end of the inside air duct communicates with the indoor space. The air supply port (35) is connected to an air supply duct (not shown). The blow-out end of the air supply duct communicates with the indoor space. The second side panel (26) has an exhaust port (36) and an outside air port (37). The exhaust port (36) is connected to an exhaust duct (not shown). The blow-out end of the exhaust duct communicates with the outdoor space. The outside air port (37) is connected to an outside air duct (not shown). The inlet end of the outside air duct communicates with the outdoor space.

The casing (20) has therein an air supply path (33A) and an exhaust path (33B). The air supply path (33A) extends from the outside air port (37) to the air supply port (35). The exhaust path (33B) extends from the inside air port (34) to the exhaust port (36).

<Total Heat Exchanger>

The total heat exchanger (44) has a horizontally long quadrangular prism shape. The total heat exchanger (44) includes, for example, two types of sheets alternately stacked in the horizontal direction. The sheets of one of the two types form a first passage (44a) communicating with the air supply path (33A). The sheets of the other type form a second passage (44b) communicating with the exhaust path (33B). Each sheet is made of a material having heat transfer and hygroscopic properties. Thus, the total heat exchanger (44) exchanges latent heat and sensible heat between the air flowing through the first passage (44a) and the air flowing through the second passage (44b).

<Air Supply Fan>

The air supply fan (40a) is disposed in the air supply path (33A) to transfer the air in the air supply path (33A). More specifically, the air supply fan (40a) is disposed in a portion of the air supply path (33A) between the first passage (44a) of the total heat exchanger (44) and the indoor heat exchanger (43).

<Exhaust Fan>

The exhaust fan (40b) is disposed in the exhaust path (33B) to transfer the air in the exhaust path (33B). More specifically, the exhaust fan (40b) is disposed in a portion of the exhaust path (33B) downstream of the second passage (44b) of the total heat exchanger (44).

<Indoor Heat Exchanger>

The indoor heat exchanger (43) is disposed in a portion of the air supply path (33A) near the front panel (23). The indoor heat exchanger (43) is configured as, for example, a fin-and-tube heat exchanger.

<Humidifying Element>

The humidifying element (45) is disposed in a portion of the air supply path (33A) near the front panel (23). The humidifying element (45) is disposed in a portion of the air supply path (33A) downstream of the indoor heat exchanger (43). The humidifying element (45) includes a plurality of hygroscopic materials, which extend vertically, and are horizontally arranged. Water from a water supply tank (48) is supplied to these hygroscopic materials. The humidifying element (45) gives evaporated air to the air flowing around the hygroscopic materials. The air flowing through the air supply path (33A) is humidified in this manner.

The water supply tank (48) is formed of a square container extending back and forth along the humidifying element (45). A water pipe (49) for supplying humidifying water to the water supply tank (48) is connected to the water supply tank (48) (see FIG. 7). The water pipe (49) extends back and forth along the humidifying element (45) and the water supply tank (48). The water pipe (49) is a pipe (component) to which the attachment portion (52) of the camera (70) is to be attached.

<Drain Pan>

As schematically illustrated in FIG. 8, the drain pan (60) is installed below the indoor heat exchanger (43) to collect the condensed water generated in the indoor heat exchanger (43). The drain pan (60) according to the second embodiment is disposed below the humidifying element (45). This allows the drain pan (60) to collect water (humidifying water) flowing out of the humidifying element (45).

<Electric Component Box>

Figure 9:
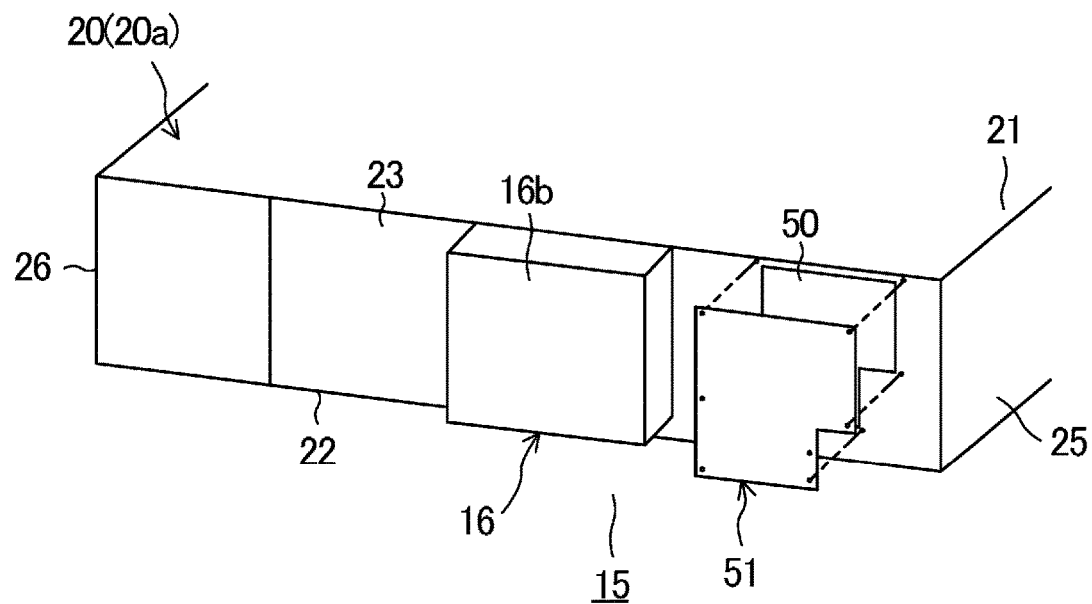
FIG. 9 is a perspective view illustrating the structure of an imaging unit according to a variation.

As illustrated in FIGS. 7 and 9, the electric component box (16) is provided on a substantially central portion of a front surface of the front panel (23). The electric component box (16) houses therein electric components similar to those in the first embodiment.

<Inspection hole and Inspection Cover>

As illustrated in FIG. 7, the inspection hole (50) is formed in a portion of the front panel (23) near the indoor heat exchanger (43) and the humidifying element (45). The inspection hole (50) is formed at a position corresponding to the drain pan (60) and the humidifying element (45). Detaching the inspection cover (51) from the inspection hole (50) allows the inside of the drain pan (60) and the humidifying element (45) to be inspected from the maintenance space (15). The inspection cover (51) is attached to the casing body (20a) through a plurality of fastening members.

<Attachment Position of Camera>

As illustrated in FIG. 7, the camera (70) of this embodiment is connected to, for example, a water pipe (49), which is a component, via an attachment portion (52) which is similar to that in the first embodiment. Specifically, the water pipe (49) is sandwiched between the pair of clamping members (53) of the attachment portion (52). At this time, the position for attaching the camera (70) is slightly adjusted so that the camera (70) faces the inside of the drain pan (60). Further, the adjustment mechanism (100) slightly adjusts the imaging direction of the camera (70). This allows the drain pan (60) to be easily positioned in the imaging area of the camera (70).

Figure 6:
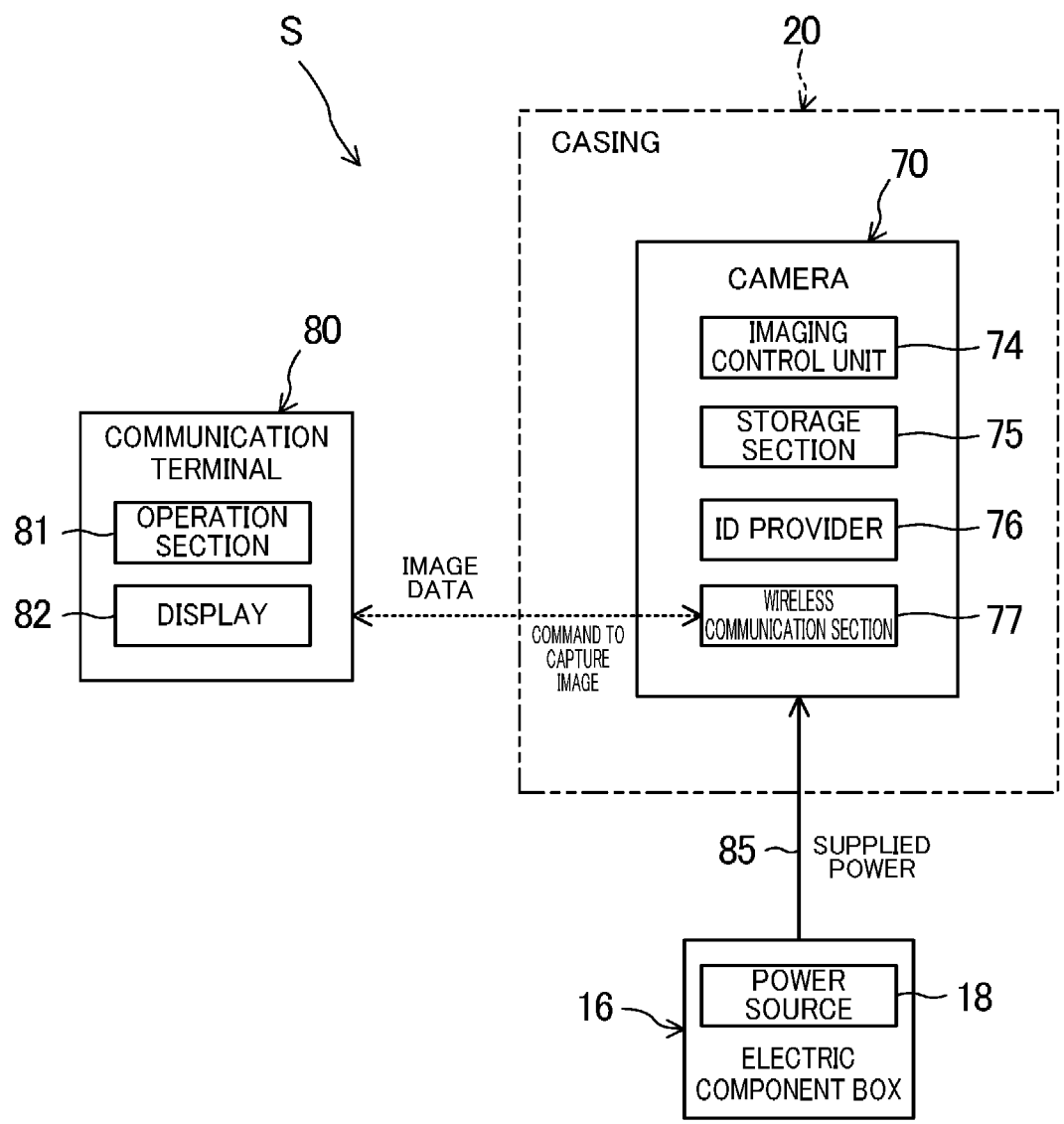
FIG. 6 is a block diagram schematically illustrating an imaging system according to the first embodiment.

The basic configuration of the imaging system (S) is the same as that of the first embodiment (see FIG. 6).

—Operation—

A basic operation of the air-conditioning device (10) according to the second embodiment will be described with reference to FIGS. 7 and 8. The air-conditioning device (10) is configured to be capable of performing a cooling operation and a heating operation.

Just like the first embodiment described above, while the indoor heat exchanger (43) serves as an evaporator in the cooling operation, the indoor heat exchanger (43) serves as a condenser (a radiator) in the heating operation. In the heating operation, the humidifying element (45) operates to humidify air. In the cooling operation and the heating operation, when the air supply fan (40a) and the exhaust fan (40b) operate, outdoor air (OA) is introduced through the outside air port (37) into the air supply path (33A), and at the same time, room air (RA) is introduced through the inside air port (34) into the exhaust path (33b). Thus, an indoor space is ventilated.

In the cooling operation, the outdoor air (OA) introduced into the air supply path (33A) flows through the first passage (44a) of the total heat exchanger (44). Meanwhile, the room air (RA) introduced into the exhaust path (33B) flows through the second passage (44b) of the total heat exchanger (44). For example, in the summer season, the outdoor air (OA) has a higher temperature and a higher humidity than the room air (RA). For this reason, latent heat and sensible heat of the outdoor air (OA) are given to the room air (RA) in the total heat exchanger (44). As a result, the air is cooled and dehumidified in the first passage (44a). In the second passage (44b), the air to which latent heat and sensible heat are given passes through the exhaust port (36), and is discharged as exhaust air (EA) to the outdoor space.

The air cooled and dehumidified in the first passage (44a) is cooled in the indoor heat exchanger (43), and then passes through the humidifying element (45) at rest. Thereafter, the air passes through the air supply port (35), and is supplied as supply air (SA) to the indoor space.

In the heating operation, the outdoor air (OA) introduced into the air supply path (33A) flows through the first passage (44a) of the total heat exchanger (44). Meanwhile, the room air (RA) introduced into the exhaust path (33B) flows through the second passage (44b) of the total heat exchanger (44). For example, in the winter season, the outdoor air (OA) has a lower temperature and a lower humidity than the room air (RA). For this reason, latent heat and sensible heat of the room air (RA) is given to the outdoor air (OA) in the total heat exchanger (44). As a result, the air is heated and humidified in the first passage (44a). In the second passage (44b), the air from which latent heat and sensible heat are taken passes through the exhaust port (36), and is discharged as exhaust air (EA) to the outdoor space.

The air heated and humidified in the first passage (44a) is heated in the indoor heat exchanger (43), and then passes through the humidifying element (45). The humidifying element (45) gives water vaporized through the hygroscopic materials to the air, which is further humidified. The air that has passed through the humidifying element (45) passes through the air supply port (35), and is supplied as supply air (SA) to the indoor space.

<Checking of States of Drain Pan and Humidifying Element>

In the second embodiment, the state of the drain pan (60) can be checked in the same manner as in the first embodiment. That is, when an imaging command is input from the communication terminal (80) to a wireless communication section (77) of a camera (70), the camera (70) captures an image. This allows image data of the inside of the drain pan (60) to be acquired and the state of the drain pan (60) to be determined in the summer season, for example.

When the humidifying element (45) is actuated with the heating operation, scale may generate on and fungi may be grown on the surfaces of the hygroscopic materials. In the second embodiment, image data of the humidifying element (45) can also be acquired by the camera (70). This allows the state of such humidifying element (45) to be easily determined.

Advantages other than these are the same as those of the first embodiment.

Figure 10:
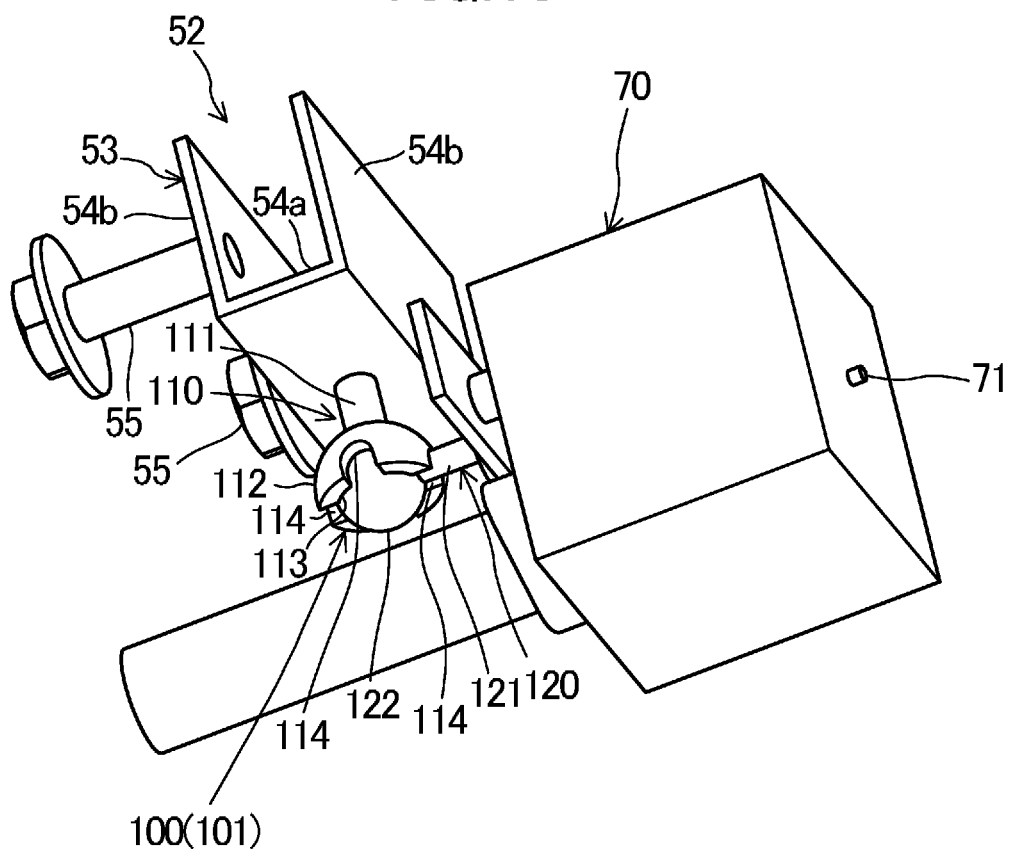
FIG. 10 is a perspective view illustrating the structure of an imaging unit according to the second embodiment.

«Variations of Attachment Portion» The configuration of the attachment portion (52) in the variation illustrated in FIG. 10 is different from that in the second embodiment. Specifically, the attachment portion (52) includes an attachment member (54) having a U-shaped cross section and a fastening member (55) (for example, a bolt nut) fastened to the attachment member (54). The attachment member (54) includes a substrate (54a) to which a rod (111) is coupled, and a pair of clamping plate (54b) extending from both ends in the width direction of the substrate (54a) to the opposite side to the rod (111). The substrate (54a) and the clamping plates (54b) are formed of an elastic metal material or resin material. The clamping plates (54b) are configured as a pair of clamping members which are opposed to each other so as to constitutes a pair of holding members opposed to clamp the component. The fastening member (55) is configured as a pressing member for pressing the clamping plates (54b) so as to reduce a gap between the pair of support plates (73). Although the attachment portion (52) of the example illustrated in FIG. 10 includes two fastening members (55), the number of the fastening members may be one or three or more.

In the attachment portion (52) of the variation, the fastening member (55) is fastened with a predetermined component positioned in the attachment member (54). Accordingly, the component is held in the attachment member (54), and the camera (70) is supported by the component.

«Variations of Imaging System»

The imaging system (S) according to any of the following variations may be employed in the air-conditioning device (10) according to each embodiment (including the third embodiment to be described later.)

<First Variation>

Figure 11:
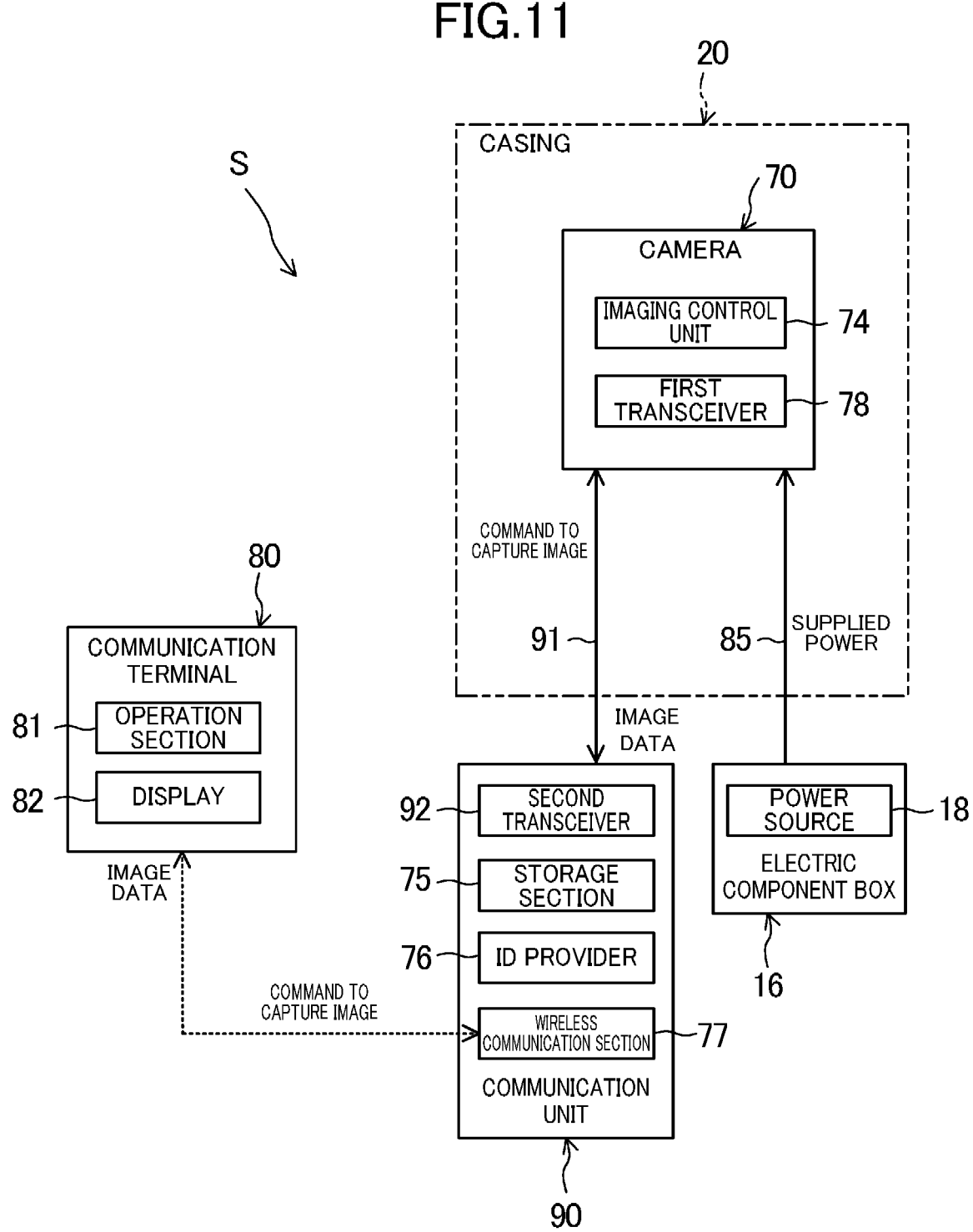
FIG. 11 is a block diagram illustrating a schematic configuration of an imaging system according to the first variation.

The imaging system (S) of the first variation shown in FIG. 11 includes a communication unit (90) separate from a camera (70). The communication unit (90) is disposed outside the casing (20), and is connected to the camera (70) via a transmission line (91). The transmission line (91) is inserted into a through hole for wiring formed in the inspection cover (51), for example. The transmission line (91) is connected to a first transceiver (78) of the camera (70) and a second transceiver (92) of the communication unit (90). Thus, image data and signals can be exchanged between the camera (70) and the communication unit (90).

In the first and second embodiments, the camera (70) includes the storage (75), the ID provider (76), and the wireless communication section (77). In contrast, in the first variation, the communication unit (90) includes a storage (75), an ID provider (76), and a wireless communication section (77). A communication terminal (80) is wirelessly connected to the wireless communication section (77) of the communication unit (90).

In the first variation, a command to capture an image from the communication terminal (80) is wirelessly transmitted to the communication unit (90). This command to capture an image is input to the camera (70) via a transmission line (91). Accordingly, the camera (70) captures an image.

The image data acquired by the camera (70) are input to the communication unit (90) via the transmission line (91), and is stored in the storage (75) as appropriate. At this time, the ID provider (76) associates ID information corresponding to the image data with the image data. The image data including assigned ID information is wirelessly transmitted to the communication terminal (80) as appropriate.

In the first variation, the communication unit (90) wirelessly exchanging data with the communication terminal (80) is provided outside the casing (20). Thus, radio waves between the communication terminal (80) and the communication unit (90) are less likely to interfere with each other. As a result, data are stably transmitted.

<Second Variation>

Figure 12:
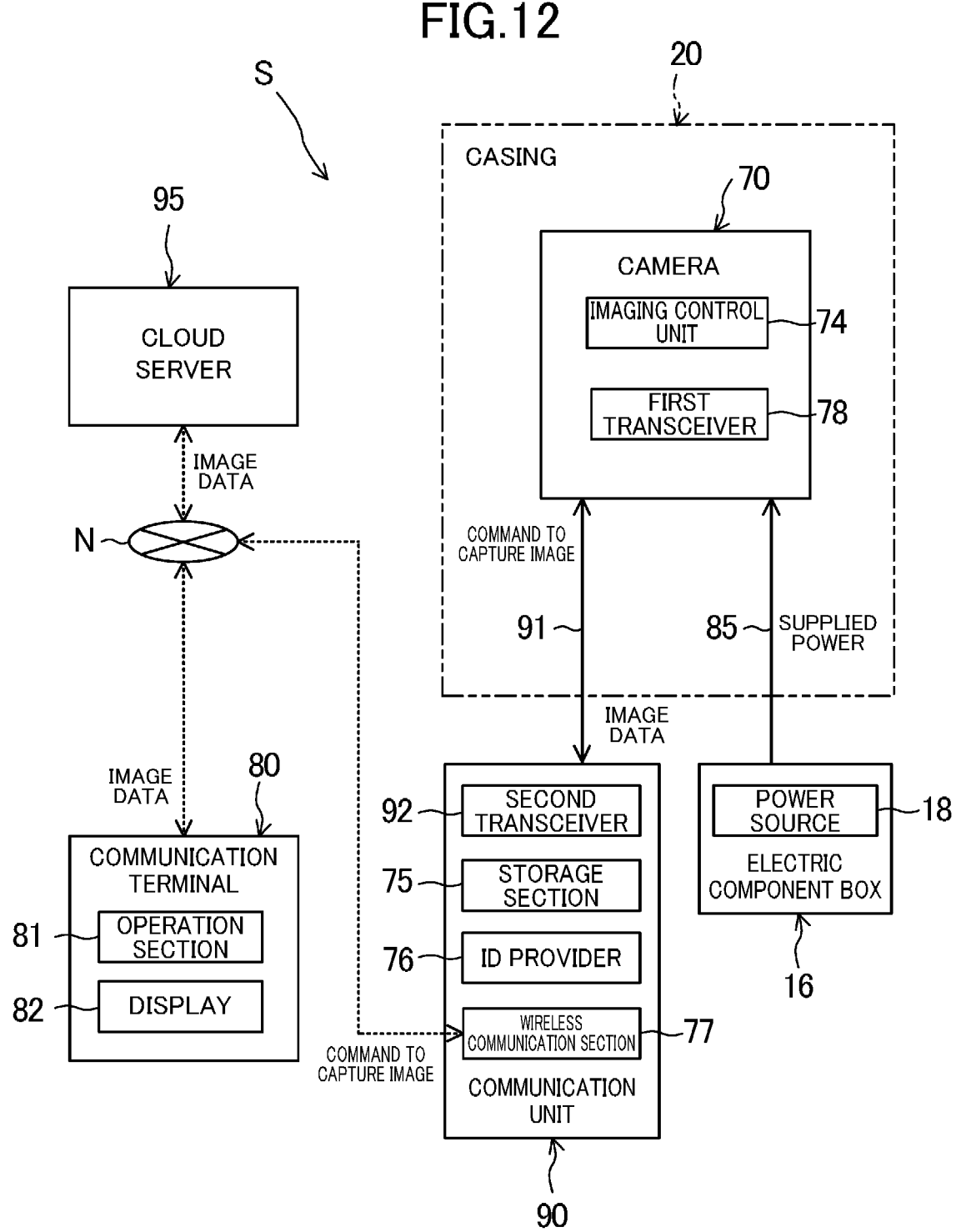
FIG. 12 is a block diagram illustrating a schematic configuration of an imaging system according to the second variation.

In the imaging system (S) of the second variation illustrated in FIG. 12, the communication unit (90) and the communication terminal (80) are connected to a cloud server (95) via the network (N). For example, the image data in the communication unit (90) are sent to the cloud server (95) via the network (N), and is stored in the cloud server (95). The communication terminal (80) can acquire image data from the cloud server (95).

<Third Variation>

Figure 13:
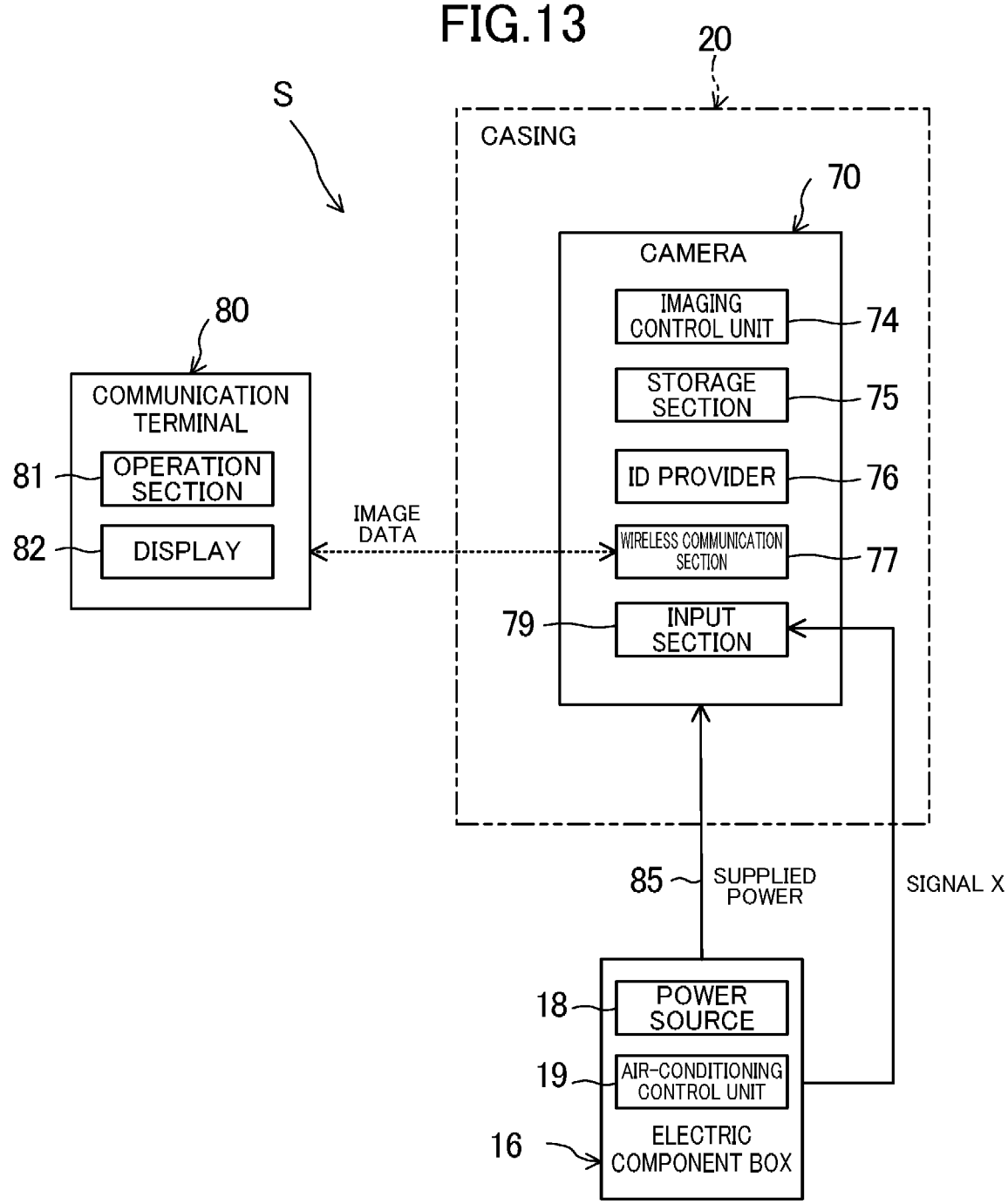
FIG. 13 is a block diagram illustrating a schematic configuration of an imaging system according to the third variation.

An imaging system (S) of the third variation illustrated in FIG. 13 controls a camera (70) with operation of each component of the air-conditioning device (10). This point is described in detail below.

In the third variation, the electric component box (16) is provided with an air-conditioning control unit (19). The air-conditioning control unit (19) is configured to control the fan (40), the drain pump (66), various components of the refrigerant circuit, and other components as appropriate in the cooling and heating operations described above.

The camera (70) in the third variation is provided with an input section (79). A signal (X) corresponding to an operation command from the air-conditioning control unit (19) is input to the input section (79). The imaging control unit (74) makes the camera (70) capture an image in synchronization with the input of a signal (X) to the input section (79).

First, the timing of imaging by the camera (70) of the imaging system (S) according to the third variation is described below with reference to a timing chart illustrated in FIG. 14. This description is directed to the air-conditioning device (10) according to the first embodiment. Specifically, the camera (70) of this example captures an image before the start of an operation of the fan (40) and before the start of a cooling action of the indoor heat exchanger (43).

The cooling action of the indoor heat exchanger (43) as used herein means an action of cooling air through a refrigerant flowing through the indoor heat exchanger (43) serving as an evaporator. Thus, the state where the indoor heat exchanger (43) is at rest means a state where the refrigerant does not substantially flow through the indoor heat exchanger (43), and air is not cooled. In the air-conditioning device (10), for example, the compressor stops, or the flow of the refrigerant through the indoor heat exchanger (43) is restricted, thereby causing the indoor heat exchanger (43) to be at rest.

Figure 14:
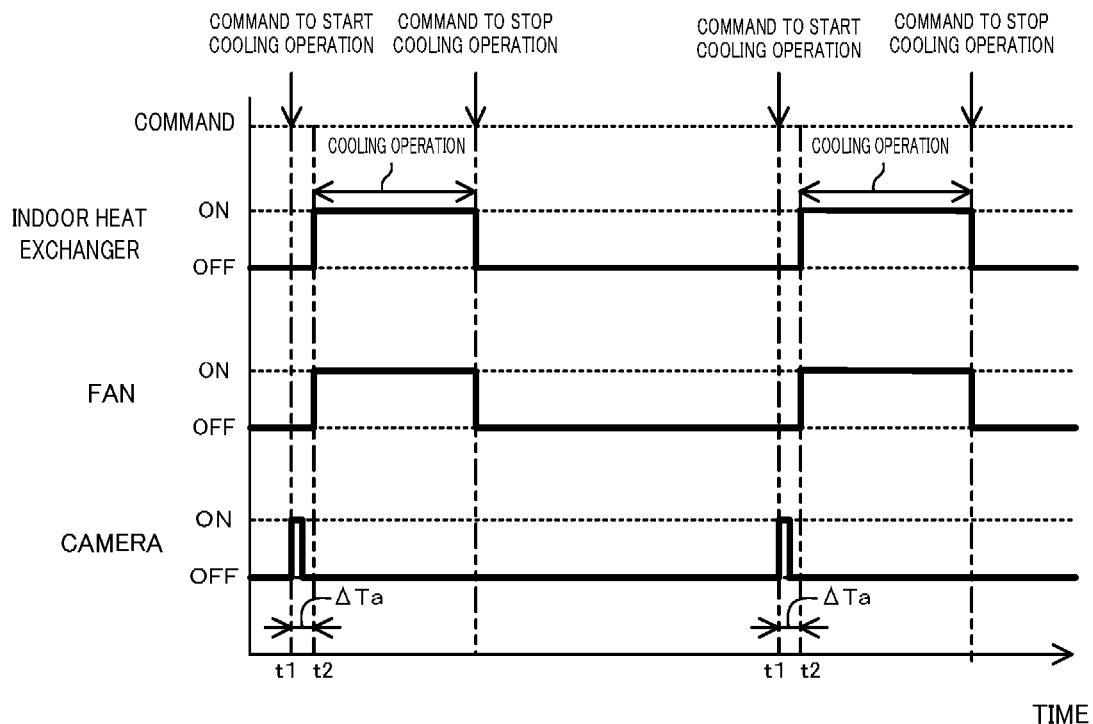
FIG. 14 is a timing chart illustrating timing of an operation of each component according the third variation.

As shown in FIG. 14, if a command to start the cooling operation is input to the air-conditioning control unit (19) at the point in time t1, the air-conditioning control unit (19) performs control for operating the fan (40) and control for starting the cooling action of the indoor heat exchanger (43) at the point in time t2 that is ΔTa later than the point in time t1. As a result, the cooling operation is started from the point in time t2.

Meanwhile, the air-conditioning control unit (19) outputs the signal (X) for triggering the camera (70) to capture an image to the camera (70) at the same time as the point in time t1 when the command to start the cooling operation is input. If this signal (X) is input to the input section (79) of the camera (70), the imaging control unit (74) makes the camera (70) capture an image. Thus, the camera (70) acquires image data of the drain pan (60) at substantially the same timing as the command to start the cooling operation. As can be seen from the foregoing description, in this embodiment, the camera (70) captures an image immediately before the start of the operation of the fan (40) and immediately before the start of the cooling action of the indoor heat exchanger (43). In other words, the camera (70) captures an image immediately before the start of the cooling operation.

At the point in time t1 of imaging, the fan (40) and the indoor heat exchanger (43) are at rest. Thus, at the point in time t1, the total power consumed by the air-conditioning device (10) is low. This allows sufficient power to be reliably supplied to the camera (70) from the power source (18).

The fan (40) in operation causes the surface of the condensed water inside the drain pan (60) to be unstable due to the air flow through the drain pan (60) and the influence of vibrations. In contrast, in this embodiment, since the fan (40) is at rest at the point in time t1, the surface of the condensed water inside the drain pan (60) is also stabilized. This can prevent the unstable surface of the condensed water from causing the image data of the drain pan (60) to be blurred.

While the indoor heat exchanger (43) is performing the cooling action, condensed water is easily generated from the air cooled in the indoor heat exchanger (43). Thus, the water surface in the drain pan (60) tends to rise. In contrast, in this example, at the point in time t1, the indoor heat exchanger (43) is at rest. This prevents the cooling action of the indoor heat exchanger (43) from causing the water surface in the drain pan (60) to rise. This can prevent the rising surface of the condensed water from causing the image data of the drain pan (60) to be blurred.

During the period between the previous cooling operation and the next cooling operation (i.e., the period during which the air-conditioning device (10) is at rest), decomposition of the condensed water accumulated in the drain pan (60) and the formation of mold gradually progress. Thus, immediately before the start of the cooling operation, such decomposition of the condensed water and the degree of mold formed tend to be apparent. In this embodiment, the drain pan (60) is imaged at the point in time t1 immediately before the start of the next cooling operation. Thus, the decomposition of the condensed water and the formation of mold are apparent from the image data. This allows the degree of dirt on the drain pan (60) to be more clearly determined.

<Other Control Examples of Timing of Imaging Operation>

In the foregoing embodiment, the drain pan (60) may be imaged at the timing described below. Note that the timings in the foregoing example and other examples exemplified below may be combined together.

First Control Example

In a first control example, the camera (70) captures an image after the stop of an operation of the fan (40) and after the stop of a cooling action of the indoor heat exchanger (43).

Figure 15:
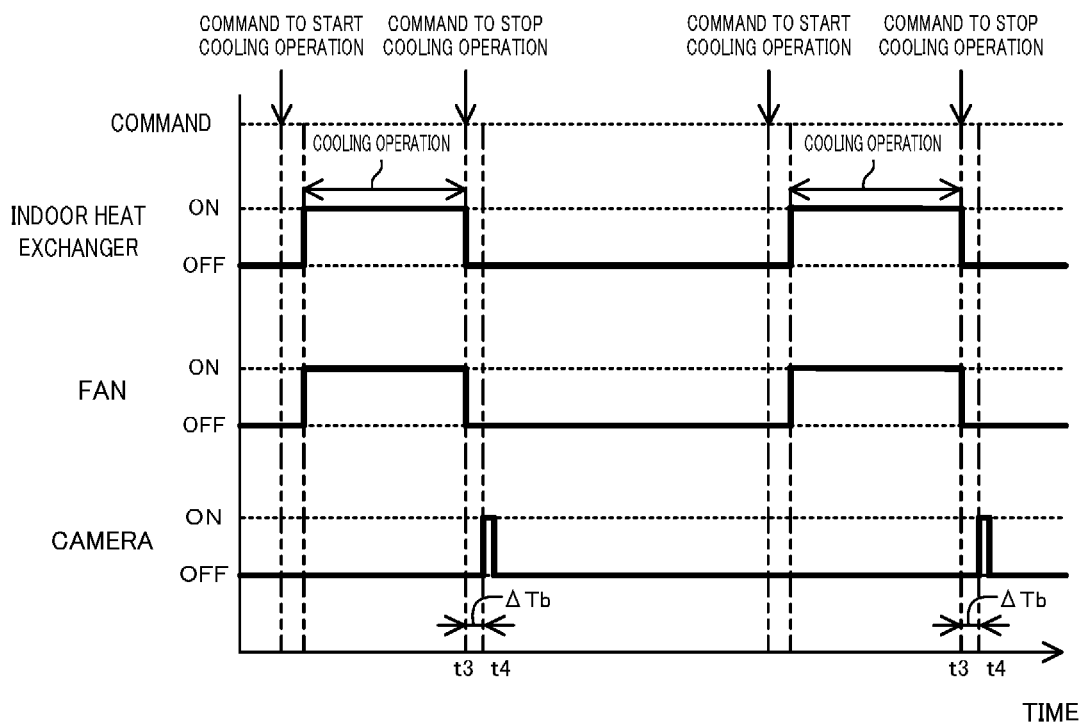
FIG. 15 is a timing chart illustrating timing of an operation of each component according a first control example in the third variation.

As shown in FIG. 15, if a command to stop a cooling operation is input to the air-conditioning control unit (19) at the point in time t3, the air-conditioning control unit (19) performs control for stopping the fan (40) and control for stopping the cooling action of the indoor heat exchanger (43). As a result, the cooling operation is stopped from the point in time t3.

Meanwhile, the air-conditioning control unit (19) outputs the signal (X) for triggering the camera (70) to capture an image to the camera (70) at the point in time t4 that is ΔTb later than the point in time t3. If this signal (X) is input to the input section (79) of the camera (70), the imaging control unit (74) makes the camera (70) capture an image. Thus, the camera (70) acquires image data of the drain pan (60) at a timing slightly later than the end of the cooling operation. As can be seen from the foregoing description, in this embodiment, the camera (70) captures an image immediately after the end of the operation of the fan (40) and immediately after the end of the cooling action of the indoor heat exchanger (43). In other words, the camera (70) captures an image immediately after the stop of the cooling operation.

At the point in time t4 of imaging according to another first control example, the fan (40) and the indoor heat exchanger (43) are at rest. Thus, just like the foregoing embodiment, the total power consumed by the air-conditioning device (10) is low. This allows sufficient power to be reliably supplied to the camera (70) from the power source (18). Further, since the fan (40) and the indoor heat exchanger (43) are at rest, the water surface in the drain pan (60) is stabilized during imaging.

The indoor heat exchanger (43) performs a cooling action, and condensed water is thus highly likely to be generated from air, until immediately before the point in time t4. Thus, at the point in time t4, the condensed water is basically accumulated inside the drain pan (60). Thus, acquiring the image data of the drain pan (60) at the point in time t4 allows the state of the condensed water inside the drain pan (60) to be checked.

—Second Control Example—

In a second control example, the camera (70) captures an image after the stop of an operation of the drain pump (66). Here, the drain pump (66) is operated at the same time as the start of the cooling operation, for example, and is stopped immediately after the stop of the cooling operation. Alternatively, the drain pump (66) may be intermittently operated using a timer or any other tool, or may be operated if the water level in the drain pan (60) exceeds a predetermined level.

Figure 16:
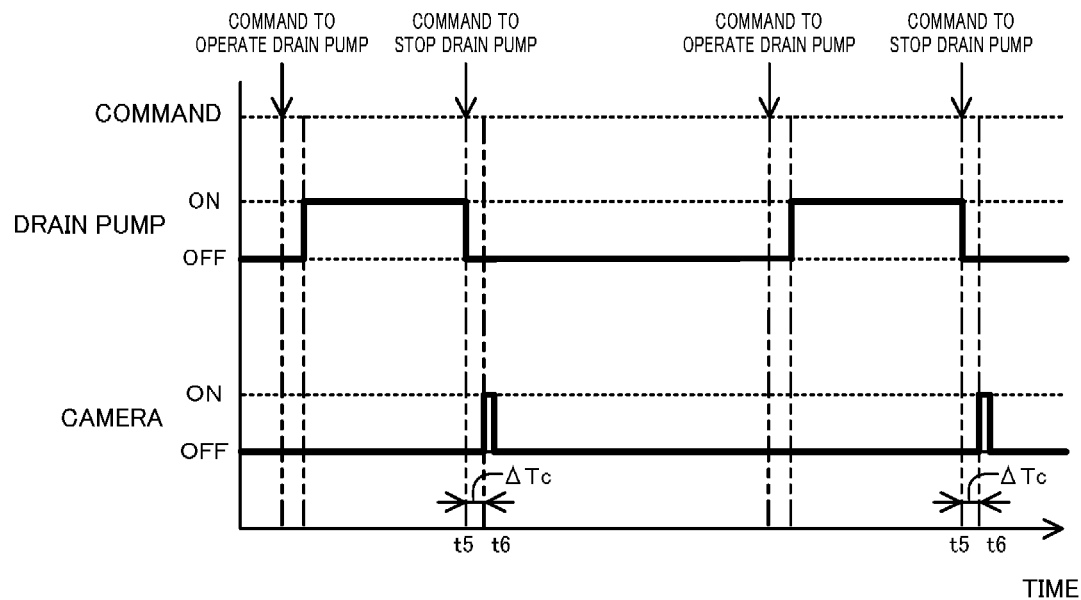
FIG. 16 is a timing chart illustrating timing of an operation of each component according a second control example in the third variation.

As shown in FIG. 16, for example, if a command to stop the drain pump (66) is issued at the point in time t5, the air-conditioning control unit (19) performs control for stopping the drain pump (66) at the point in time t5. In this case, the air-conditioning control unit (19) outputs the signal (X) to the input section (79) of the camera (70) at the point in time t6 that is $\Delta$Tc later than the point in time t5. Thus, at a point in time t6 immediately after the stop of the drain pump (66), the camera (70) captures an image.

At the point in time t6 of imaging according to another second control example, the drain pump (66) is at rest. Thus, just like the foregoing embodiment, the total power consumed by the air-conditioning device (10) is low. This allows sufficient power to be reliably supplied to the camera (70) from the power source (18).

The drain pump (66) in operation causes the surface of the condensed water inside the drain pan (60) to be unstable due to the suction of the condensed water into the drain pump (66) and vibrations of the drain pump (66). In contrast, since the drain pump (66) is at rest at the point in time t6, the surface of the condensed water inside the drain pan (60) is also stabilized. This can prevent the unstable surface of the condensed water from causing the acquired image data to be blurred.

The condensed water inside the drain pan (60) is drained until immediately before the stop of the operation of the drain pump (66). Thus, immediately after the stop of the operation of the drain pump (66), the condensed water should not be accumulated so much in the drain pan (60). Nevertheless, if a relatively large amount of condensed water is present inside the drain pan (60), the drain pump (66) may be broken, or a drain pipe may be clogged. Thus, imaging the inside of the drain pan (60) at the point in time t6 allows the foregoing problems and similar problems associated with a structure for draining the condensed water to be detected.

Third Control Example

Figure 17:
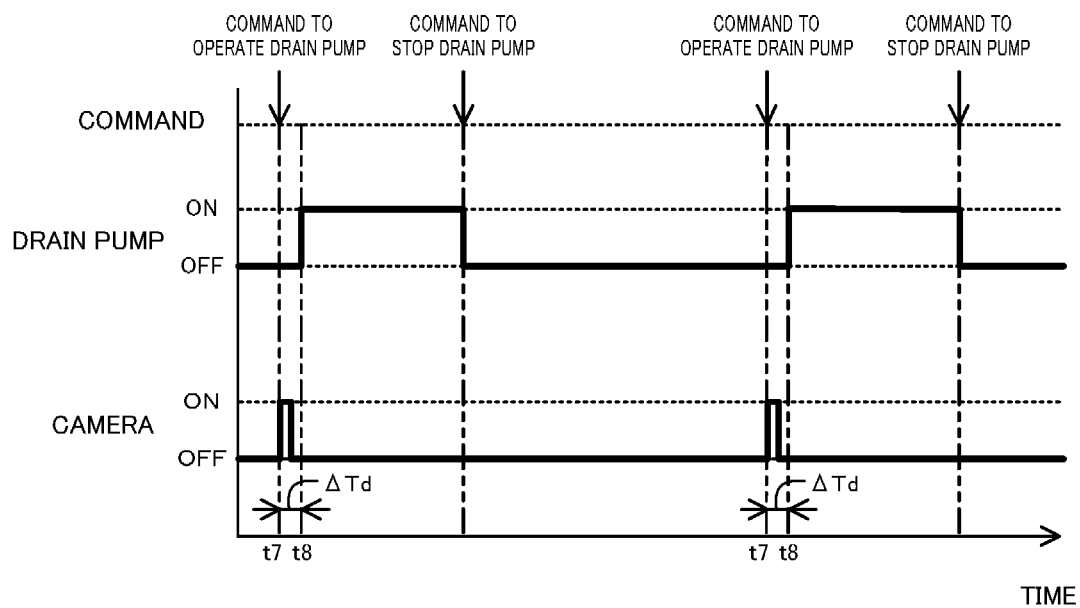
FIG. 17 is a timing chart illustrating timing of an operation of each component according a third control example in the third variation.

In a third control example, the camera (70) captures an image before the start of an operation of the drain pump (66). As shown in FIG. 17, for example, if a command to operate the drain pump (66) is issued at the point in time t7, the air-conditioning control unit (19) performs control for operating the drain pump (66) at the point in time t8 that is $\Delta$Td later than the point in time t7. Meanwhile, the air-conditioning control unit (19) outputs the signal (X) to the input section (79) of the camera (70) at the point in time t7. Thus, at the point in time t7 immediately before the operation of the drain pump (66), the camera (70) captures an image.

At the point in time t7 of imaging according to another third control example, the drain pump (66) is at rest. Thus, just like the foregoing embodiment, the total power consumed by the air-conditioning device (10) is low. This allows sufficient power to be reliably supplied to the camera (70) from the power source (18). Further, the surface of the condensed water in the drain pan (60) is also stabilized.

The condensed water is accumulated inside the drain pan (60) until before the start of the operation of the drain pump (66). Thus, the camera (70) capturing an image at the point in time t7 allows the state of the condensed water inside the drain pan (60) to be easily determined.

Fourth Control Example

The fourth control example is applied to the heating operation of the second embodiment described above. The camera (70) of the second embodiment captures an image before the start of operations of the fans (the air supply fan (40a) and the exhaust fan (40b)), before the start of a heating action of the indoor heat exchanger (43), and before the start of an operation of the humidifying element (45).

Figure 18:
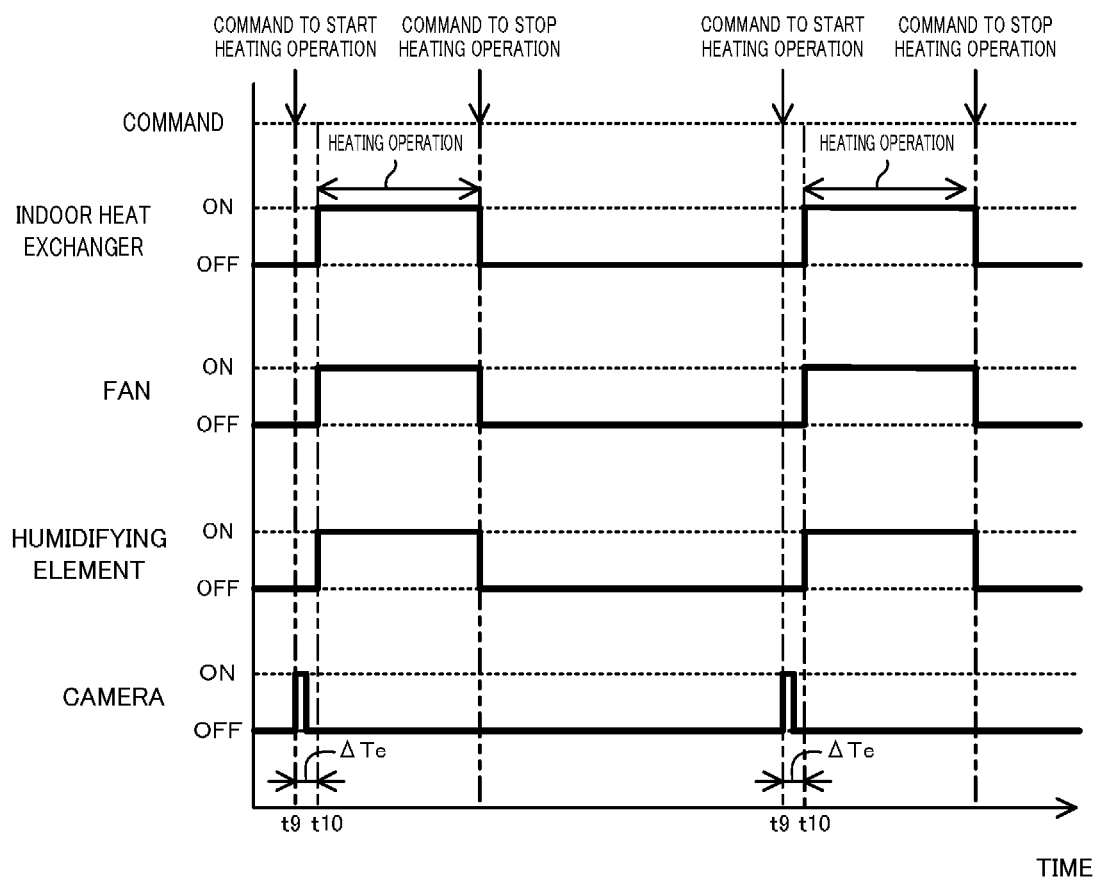
FIG. 18 is a timing chart illustrating timing of an operation of each component according a fourth control example in the third variation.

As shown in FIG. 18, if a command to start the heating operation is input to the air-conditioning control unit (19) at the point in time t9, the air-conditioning control unit (19) performs control for operating the air supply fan (40a) and the exhaust fan (40b), control for starting the heating action of the indoor heat exchanger (43), and control for operating the humidifying element (45) at the point in time t10 that is $\Delta$Te later than the point in time t9. As a result, the heating operation is started from the point in time t10.

Further, the air-conditioning control unit (19) output a signal (X) for making the camera (70) capture an image to the camera (70) at the time point t9 at which the heating operation start command is input. If this signal (X) is input to the input section (79) of the camera (70), the imaging control unit (74) makes the camera (70) capture an image. Thus, the camera (70) acquires image data of the drain pan (60) and the humidifying element (45) at substantially the same timing as the command to start the heating operation.

At the point in time t9, the air supply fan (40a), the exhaust fan (40b), the indoor heat exchanger (43), and the humidifying element (45) are at rest. Thus, at the point in time t9, the total power consumed by the air-conditioning device (10) is low. This allows sufficient power to be reliably supplied to the camera (70) from the power source (18). Further, the surface of humidifying water in the drain pan (60) is also stabilized at the point in time t9.

During the period between the previous heating operation and the next heating operation (i.e., the period during which the air-conditioning device (10) is at rest), the formation of scale and mold on the hygroscopic materials of the humidifying element (45) progresses. Thus, immediately before the start of the heating operation, the degree of such scale and mold formed tend to be apparent. In the second embodiment, the humidifying element (45) is imaged at the point in time t9 immediately before the start of the next heating operation. Thus, the formation of scale and mold is apparent from the image data of the humidifying element (45). This allows the degree of dirt on the humidifying element (45) to be more clearly determined.

<Fourth Variation>

Figure 19:
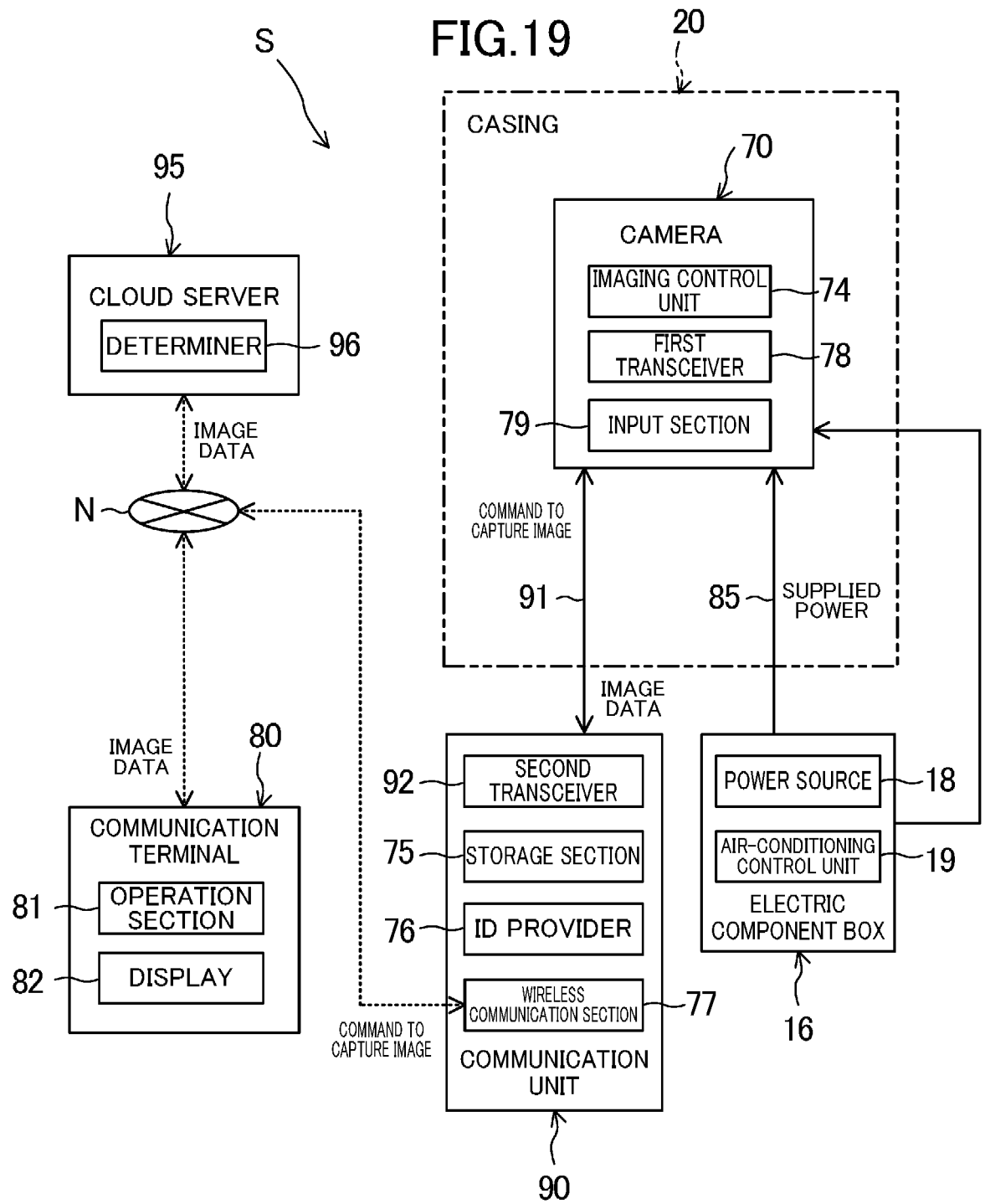
FIG. 19 is a block diagram illustrating a schematic configuration of an imaging system according to the fourth variation.

In the fourth variation illustrated in FIG. 19, a cloud server (95) of an imaging system (S) according to the third variation is provided with a determiner (96). The determiner (96) automatically determines the state of an object to be imaged, based on the image data acquired by the camera (70). The determiner (96) may be included in the communication unit (90), the camera (70), or the communication terminal (80). In the fourth variation, the image data is acquired with the start (including the stop) of the operation of the air-conditioning device (10) in the same manner as in the third variation.

If the camera (70) acquires image data on the inside of the object to be imaged in conjunction with the operation of the air-conditioning device (10), the image data are sent to the cloud server (95) via the communication unit (90). The determiner (96) of the cloud server (95) determines the state of the object to be imaged, based on these image data. Here, the determiner (96) is implemented through, for example, use of deep learning as an artificial intelligence (AI) function. Thus, the determiner (96) can determine the degree of dirt on the drain pan (60) and the humidifying element (45), for example. The determiner (96) may determine the degree of dirt on the drain pan (60) and the humidifying element (45) in the future. The determination result of the determiner (96) is transmitted to, for example, the communication terminal (80). Thus, the service provider or any other operator can determine the current or future state of the object to be imaged via the communication terminal (80). Therefore, the maintenance schedule can be planned on the basis of such information.

The image data based on which a determination is made by the determiner (96) are acquired at regular intervals in conjunction with the air-conditioning device (10) as described above. This can eliminate causes of error in the image data used for the AI, and can improve the determination accuracy. Acquiring the image data, in particular, in the shown states of the components described above can reliably eliminate the causes of error in the image data arising from the air flow or vibrations.

<Fifth Variation>

Figure 20:
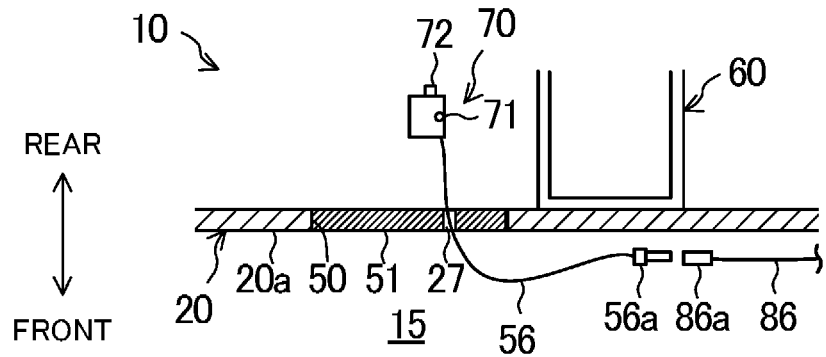
FIG. 20 is an enlarged schematic plan view of a periphery of an imaging device according to the fifth variation.

In the fifth variation, the wire (internal wire (56)) on the camera (imaging device (70)) side is connected to the external wire (86) via a first connector (56a) and a second connector (86a). As schematically illustrated in FIG. 20, one end of the internal wire (56) is connected to the camera (70). The internal wire (56) passes through an insertion hole (27) provided in the casing (20) and extends to the outside of the casing (20). In this example, the insertion hole (27) is formed in an inspection cover (51). The casing (20) may be provided with a member such as a lid for closing a gap between the inner periphery of the insertion hole (27) and the internal wire (56).

The other end of the internal wire (56) of the camera (70) in this example is disposed outside the casing (20). The other end of the casing (20) is provided with the first connector (56a). For example, one end of the external wire (86) is connected to a power source (18) inside the electric component box (16). The external wire (86) extends to the outside of the electric component box (16). The other end of the external wire (86) is disposed outside the electric component box (16). The other end of the external wire (86) is provided with the second connector (86a).

In the fifth variation, the first connector (56a) and the second connector (86a) are coupled with each other outside the casing (20). By the coupling, the internal wire (56) of the camera (70) and the external wire (86) are connected to each other, thereby enabling power to be supplied to the camera (70). The internal wire (56) and the external wire (86) may be transmission lines for exchanging image data or various signals, or may be cables capable of performing both power supply and transmission.

When the internal wire (56) and the external wire (86) are used for transmission, a wireless communication section (77) (for example, a wireless LAN adapter) is disposed in an electric component box (16), and the wireless communication section (77) and the electric component box (16) are connected to each other. Thus, image data or various signals can be exchanged between the camera (70) and the wireless communication section (77) in a wired manner. As described above, image data or various signals are wirelessly exchanged between the wireless communication section (77) and the communication terminal (80).

In the fifth variation, as described above, the internal wire (56) of the camera (70) extends to the outside of the casing (20), and the other end of the internal wire (56) is provided with a first connector (56a). Therefore, the internal wire (56) can be easily connected and detached without accessing the inside of the casing (20). The first connector (56a) of the internal wire (56) and the second connector (86a) of the external wire (86) may be coupled to each other inside the electric component box (16).

<Sixth Variation>

It is possible to employ a configuration where a contact of the internal wire (56) and a contact of the external wire (86) are connected to each other when the inspection cover (51) (casing member) is fitted to the casing body (20a). Specifically, for example, a first contact connected to the other end of the internal wire (56) is provided on an outer edge of the inspection cover (51). Then, a second contact connected to the other end of the external wire (86) is provided on an edge of the opening in the inspection hole (50). When the inspection cover (51) is fitted to the inspection hole (50), the first contact on the inspection cover (51) and the second contact on the casing body (20a) are brought into contact with each other. Thus, with the fitting of the inspection cover (51) to the inspection hole (50), the internal wire (56) on the camera (70) side can be electrically connected to the external wire (86). Accordingly, the operation for connecting the internal wire (56) and the external wire (86) can be omitted.

<Seventh Variation>

Figure 21:
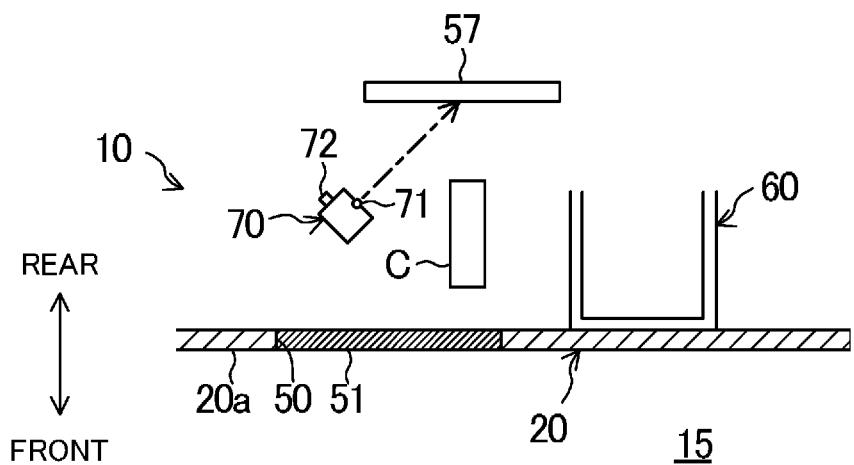
FIG. 21 is an enlarged schematic plan view of a periphery of an imaging device according to the seventh variation.

The air-conditioning device (10) of the seventh variation includes a mirror (57) for projecting a mirror image of a target object toward a camera (70). In an example schematically illustrated in FIG. 21, a drain pan (60) is the object to be imaged. In this example, another part (C) is interposed between the lens (71) of the camera (70) and the drain pan (60). Therefore, the part (C) becomes an obstacle of the camera (70), and the camera (70) cannot directly images the drain pan (60). In contrast, in this example, a mirror (57) is disposed in front of the camera (70) in the imaging direction, and a mirror image of the drain pan (60) is projected on the mirror (57). That is, relative positions of the camera (70), the object to be imaged, and the mirror (57) are set in such a manner that the mirror image of the drain pan (60) projected on the mirror (57) is formed toward the camera (70). In other words, the direction in which light directed from the camera (70) to the mirror (57) is reflected by the mirror (57) is directed toward the drain pan (60). Thus, even when a predetermined part (C) is interposed between the camera (70) and the drain pan (60), the camera (70) can indirectly image the drain pan (60) via the mirror (57).

The mirror (57) may be a commonly used mirror formed by depositing a metal such as aluminum or silver on a glass surface, or may be a so-called metal mirror having a mirror surface formed by polishing a metal.

<Eighth Variation>

Figure 22:
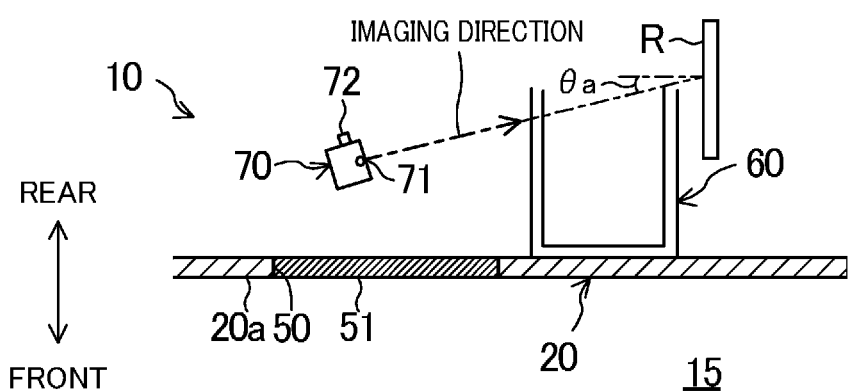
FIG. 22 is a plan view illustrating an internal structure of an imaging device according to the eighth variation.

In the air-conditioning device (10) of the eighth variation, the relative positions of a camera (70) and a reflective portion (R) are set to reduce an influence of reflected light from a light source (72) of the camera (70). In an example schematically illustrated in FIG. 22, a drain pan (60) is an object to be imaged. The reflective portion (R) is located on the back side of the drain pan (60) in the imaging direction of the camera (70). The reflective portion (R) is formed of a metal material on which light easily reflects, such as a stainless steel plate. In this example, the angle between the imaging direction of the camera (70) and the perpendicular (p) to the reflection surface of the reflective portion (R) (θa in FIG. 22) is set to a predetermined angle. In the case in which θa is 10° or less, when light emitted from the light source (72) of the camera (70) is reflected on the reflective portion (R) at the time of imaging, the reflected light falls within the imaging area of the camera (70), so that image data may be blurred. In particular, when the camera (70) performs processing in accordance with light such as automatic exposure adjustment, image data is strongly influenced by the reflected light, so that image data tends to be blurred. In contrast, in the case in which θa is larger than 10°, the reflection light can be prevented from entering the imaging area of the camera (70), so that the above problem can be avoided. The θa is preferably larger than 0° and smaller than 80°.

«Other Configuration of Camera»

The camera (70) in the present embodiment may also be configured as follows.

<Damping Member>

A damping member is preferably interposed between a camera (70) and a component (such as an inspection cover (51)) to which the camera (70) is attached. Thus, the vibration on the casing (20) side can be prevented from being transmitted to the camera (70). This can avoid image data acquired by the camera (70) from being blurred due to the influence of the vibration.

<Waterproof Structure>

The camera (70) preferably has a waterproof structure for suppressing water penetration into the inside. For example, the periphery of the camera (70) is covered with a waterproof member. This can avoid the camera (70) to be broken due to the influence of water (for example, condensed water, humidifying water, or the like) in the casing (20).

<Lens Type>

The lens (71) of the camera (70) is preferably a wide-angle lens or a fisheye lens. The wide-angle lens herein also includes a so-called super-wide-angle lens having a wider angle of view than a commonly used wide-angle lens. The angle of view of the fisheye lens is 180° or more, preferably 220° or more. Since the wide-angle lens and the fisheye lens have a wider angle of view than a conventional lens, the target object can be imaged over a wide range even if the distance between the lens (71) and the target object is relatively short.

<Automatic Processing>

The camera (70) preferably includes an automatic processing unit for performing various kinds of automatic processing. Specifically, the automatic processing unit execute at least one of an auto-focus function, an automatic exposure adjustment function, or a white balance adjustment function.

<Light Source>

Figure 23:
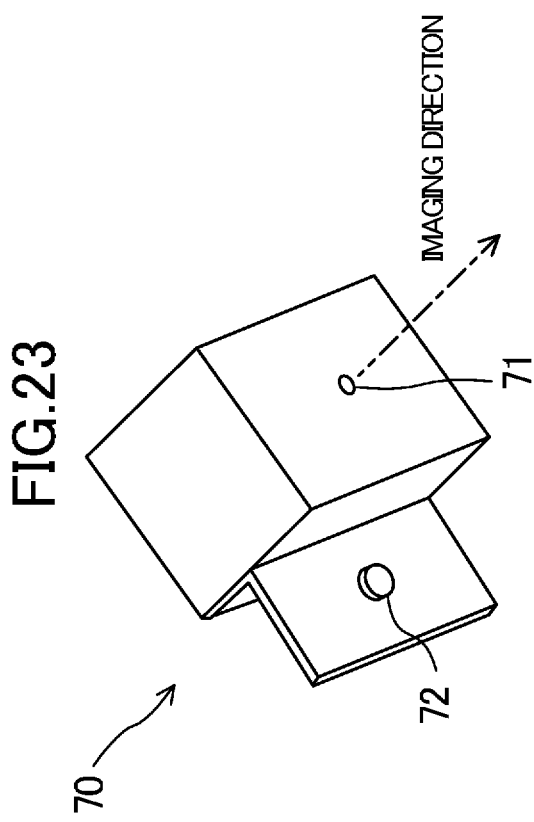
FIG. 23 is a perspective view illustrating a positional relationship between a camera and a light source.

As illustrated in FIG. 23, the camera (70) includes a light source (72) (flash) for illuminating an object to be imaged. The light source (72) is provided behind the lens (71) of the camera (70) in the imaging direction. When the light source (72) is located in front of the lens (71), the light source (72) may directly enter the imaging area of the camera (70), and image data may be blurred due to the influence of light. In contrast, when the light source (72) is provided behind the lens (71), the light source (72) can be avoided from directly entering the imaging area of the camera (70). This can avoid the image data from being blurred due to the influence of the light source (72).

If the light of the light source (72) is too intense, the reflected light incident on the lens (71) is also intense, so that the image data may be blurred due to halation. Thus, a translucent material such as obscure glass (frosted glass) may be used as glass for covering a light emitter of the light source (72).

Third Embodiment

The air-conditioning device (10) according to the third embodiment is a ceiling hanging-type or ceiling embedded-type air-conditioning device. The air-conditioning device (10) includes an outdoor unit (not shown) and an indoor unit (11), and a refrigerant circuit is formed by connecting the outdoor unit and the indoor unit (11) via a refrigerant pipe.

Figure 24:
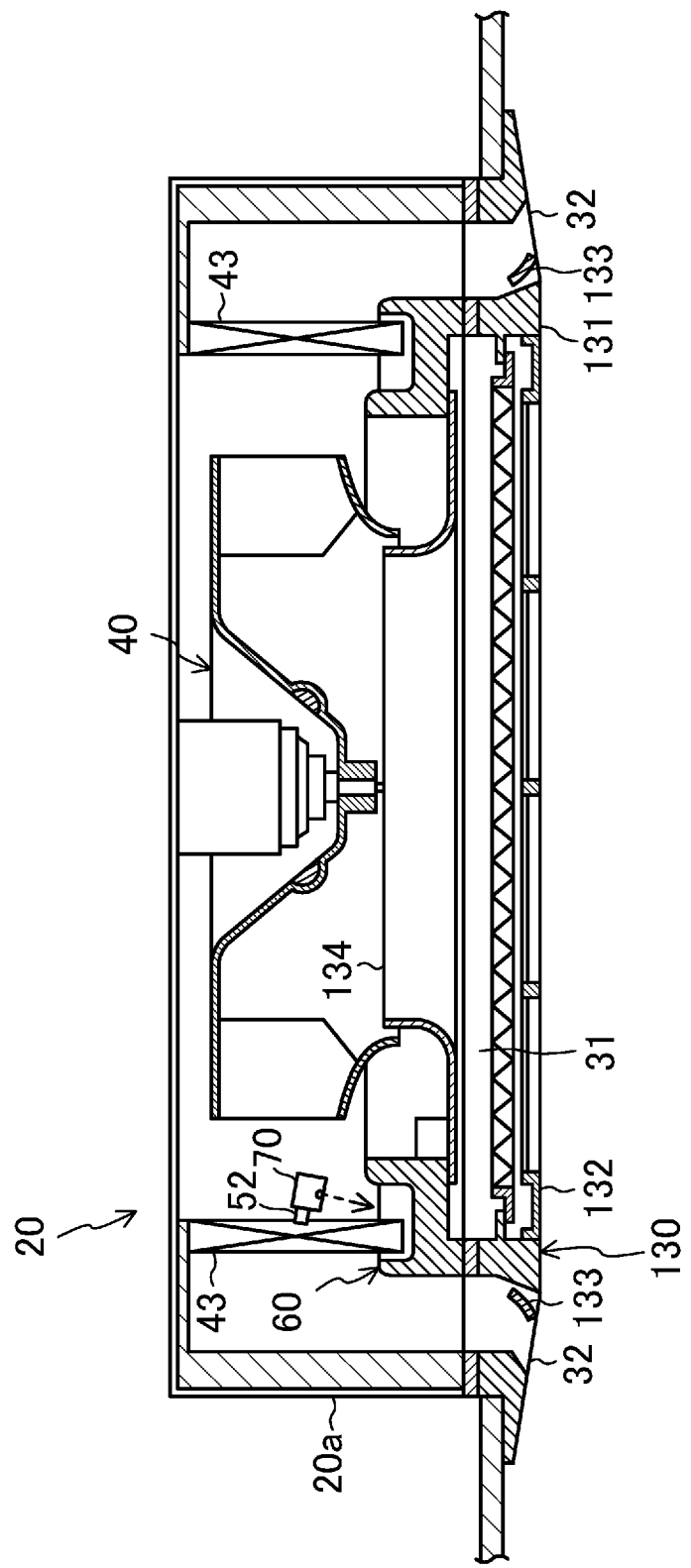
FIG. 24 is a longitudinal cross-sectional view of an air-conditioning device according to the third embodiment.

As illustrated in FIG. 24, the indoor unit (11) includes a casing (20) installed a ceiling cavity. That is, the casing (20) includes a rectangular plate-shaped casing body (20*a*) having a lower opening surface and a panel (130) (casing member) provided detachably to the casing body (20*a*) so as to close the opening surface. The panel (130) includes a rectangular frame-shaped panel body (131) and an intake grille (132) provided at the center of the panel body (131).

An suction port (31) is formed in the center of the panel body (131). The intake grille (132) is attached to the suction port (31). A blow-out port (32) is formed in each of four side edges of the panel body (131). The blow-out ports (32) extend along the respective side edges. A wind direction adjusting flap (133) is provided in each of the blow-out ports (32).

The casing body (20*a*) houses therein a bell mouth (134), an indoor fan (40), an indoor heat exchanger (43), and a drain pan (60). The bell mouth (134) and the indoor fan (40) are disposed above the intake grille (132). The indoor heat exchanger (43) is disposed over the indoor fan (40). The indoor heat exchanger (43) is configured as a fin-and-tube heat exchanger. The drain pan (60) is disposed below the indoor heat exchanger (43).

In the example of FIG. 24, the camera (70) is attached to the indoor heat exchanger (43) via the attachment portion (52). Specifically, the attachment portion (52) is attached to the heat transfer tube or the pipe plate of the header collecting pipe (43), which is a component. The attachment portion (52) is attached to and detached from the indoor heat exchanger (43). This allows the camera (70) to be easily attached.

«Arrangement of Imaging Device Considering Air Flow»

In the camera (70) which is an imaging device inside the casing (20), the flow velocity of surrounding air is preferably relatively low. Specifically, the camera (70) is disposed at a position at which air at a flow velocity that is 30% of an average flow velocity Va of air blown out of the blow-out port (32) of the air-conditioning device (10) flows. When the flow velocity of air around the camera (70) is excessively large, dust and the like in the air easily adhere to the surface of the lens (71) of the camera (70), and the lens (71) becomes easily dirty. In contrast, when the flow velocity of air around the camera (70) is 30% or less of the average flow velocity Va of the blown air, the dirt on the lens (71) can be reduced.

The lens (71) of the camera (70) preferably faces the leeward side (downstream side of the air flow). In this manner, dust and the like in the air hardly adhere to the lens (71), so that the dirt on the lens (71) can be reduced. With the lens (71) facing the leeward side, the flow velocity of the air around the lens (71) is preferably 30% or less of the average flow velocity Va.

The lens (71) of the camera (70) may face the upwind side (upstream side of the air flow). In this case, a fisheye lens (spherical lens) is preferably used as the lens (71) of the camera (70).

«Other Variations of Drain Pan»

The water level of the drain pan (60) can be detected using halation such as described above. Specifically, when the water level in the drain pan (60) reaches a predetermined level (for example, the upper limit of the water level), relative positions of the camera (70) and the drain pan (60) are set so that halation occurs. Accordingly, it becomes possible to determine that the water level of the drain pan (60) reaches a predetermined water level on the basis of image data involving halation occurred.

A float or the like may be provided inside the drain pan (60), or scale or a mark may be attached to the inner wall of the drain pan (60). This allows the water level of the drain pan (60) in the image data to be determined easily.

A light emitting paint which emits light by ultraviolet rays may be applied to the inner wall of the drain pan (60), and the light emitting paint may be irradiated with ultraviolet (UV) lamp or the like. When the drain pan (60) is imaged in a state in which the light-emitting paint emits bright light, dirt or biofilm in the drain pan (60) becomes black. This allows the dirt and biofilm in the drain pan (60) to be easily determined in the image data.

The camera (70) may be disposed such that the lens (71) of the camera (70) corresponds to a predetermined water level in the drain pan (60). In this case, when the water level of the drain pan (60) reaches the predetermined water level, the lens (71) is soaked in water, and image data in this state is acquired. It is thus determined that the water level in the drain pan (60) reaches the predetermined height on the basis of this image data.

«Variations of Components Provided in Imaging Device»

The components provided with the imaging device (70) are not limited to the refrigerant pipes (the header collecting pipe (47) and the water pipe (49)) described above. Examples of the components include plate-shaped members such as a pipe fixing plate for supporting a pipe, a pipe plate for a heat exchanger, and a pressing plate for a heat exchanger. Examples of the components further include a motor support for supporting the motor of the fan (40), a water tank (for example, the above-described water supply tank), and connecting ports for a duct (a blowout port, an suction port). These components are parts that are usually not detached when the maintenance is performed.

A part which is detached from the casing body (20a) during maintenance may be attached, as a component, to the attachment portion (52) to support the camera (70). Examples of the pat include an inspection cover (51), a drain pump (66), a valve (electromagnetic valve) connected to the water pipe, a valve (for example, an electromagnetic valve or an expansion valve) connected to the refrigerant pipe, and a float switch. In the second embodiment described above, examples of the component include a humidifying element (45) and a lid of the water supply tank. In the third embodiment described above, examples of the component include the electric component box installed in the casing (20) and the panel (130) (the panel body (131) and the intake grille (132)).

«Variations of Object to Be Imaged»

The objects to be imaged by the imaging device (70) may be other than the drain pan (60) and the humidifying element (45). The objects may be, for example, a drain pump (66), an air filter, a heat exchanger (for example, indoor heat exchanger (43)), a fan (40), a drain port (including also a drain port in the drain pan (60)), and a water surface (water level) in the drain pan (60).

As described above, water (humidifying water) flowing out of the humidifying element (45) is collected in the drain pan (60) of the second embodiment. When the humidifying element (45) does not operate normally, redundant humidifying water does not flow to the drain port of the drain pan (60). Whether the humidifying element (45) operates normally can be determined by determining the presence or absence of water in the vicinity of the drain port of the drain pan (60) from image data.

«Variations of Attachment Portion»

The attachment portion (52) does not necessarily clamp the component (C). For example, the attachment portion (52) may be a fastening member that is detachably wound around the component (C), such as a binding band or a hook-and-loop fastener.

Other Embodiments

All the above-described embodiments may be modified as follows.

The imaging device (70) should not be limited to a camera, and may be, for example, an optical sensor or the like.

The imaging control unit (74) of the imaging device (70) may not necessarily be provided on the camera (70) side, and may be provided on the communication unit (90) side illustrated in FIG. 11, for example. Further, the camera (70) may start the imaging operation by turning ON the camera (70) (supplying current to the camera (70)). In this case, the camera (70) may be controlled such that current is applied to the camera (70) at the timing at which the camera (70) starts the imaging operation.

The imaging device (70) is used in a casing (20) of an indoor unit (11) installed in the ceiling cavity, but may be used in a casing of a floor-mounted, wall-mounted, or ceiling-suspended indoor unit, or any other type of indoor unit. The imaging device (70) may be applied to the casing of the outdoor unit.

The various imaging timings shown in the cooling operation and the heating operation described above may be combined in any pattern within a practicable range.

The imaging device (70) may be used in air processing devices other than the air-conditioning device (10). Examples of the other air processing devices include a humidity control apparatus for controlling the humidity of air, a ventilation apparatus for ventilating the interior of the room, and an air purification apparatus for purifying the air.

INDUSTRIAL APPLICABILITY

The present invention is useful for air processing devices.

DESCRIPTION OF REFERENCE CHARACTERS

10 Air-conditioning Device (Air processing device)
20 Casing
20a Casing Body (Body)
40 Fan (Object to Be Imaged)
43 Indoor Heat Exchanger (Object to Be Imaged)
45 Humidifying Element (Object to Be Imaged)
51a Inner Wall
52 Attachment Portion
53 Clamping Member
55 Fastening Member (Pressing Member)
56 Wire (Internal Wire)
56a First Connector (Connector)
60 Drain Pan (Object to Be Imaged)
66 Drain Pump (Object to Be Imaged)
70 Camera (Imaging Device)
71 Lens
72 Light Source
77 Wireless Communication Section
80 Receiver
86 External Wire
91 Transmission Line

The invention claimed is:

1. An air processing device comprising:
a casing; and
an imaging device that acquires image data of at least one predetermined object to be imaged positioned in the casing, wherein
the casing includes an inspection hole,
a body of the casing is provided with a predetermined component,
an inspection cover is provided which is detachably attached to the body of the casing to open and close the inspection hole,
the imaging device includes an attachment portion detachably attached to the component so as to be at a position at which the imaging device can image the at least one predetermined object to be imaged, and
the attachment portion of the imaging device is attached to a portion, of the component, exposed to an outside of the casing via the inspection hole.

2. The air processing device of claim 1, wherein
the attachment portion includes:
a pair of clamping members that are opposed to each other so as to clamp the component; and
a pressing member for pressing the clamping members so as to reduce a gap between the pair of clamping members.

3. The air processing device of claim 1, further comprising:
a wireless communication section that wirelessly transmits image data acquired by the imaging device to the outside of the casing.

4. The air processing device of claims 3, wherein
the at least one predetermined object to be imaged includes at least one of a drain pan, a drain port, a drain pump, a float switch, or a humidifying element.

5. The air processing device of claim 1, further comprising:
a transmission line that transmits image data acquired by the imaging device to the outside of the casing in a wired manner; and
a wireless communication section that wirelessly transmits output data from the transmission line to a predetermined receiver, the wireless communication section being disposed outside the casing.

6. The air processing device of claims 5, wherein
the at least one predetermined object to be imaged includes at least one of a drain pan, a drain port, a drain pump, a float switch, or a humidifying element.

7. The air processing device of claim 1, further comprising:
a wire one end of which is connected to the imaging device and that extends to the outside of the casing, wherein
the other end of the wire is provided with a connector coupled with external wire.

8. The air processing device of claim 1, wherein
the imaging device includes a wide-angle or fisheye lens.

9. The air processing device of claim 1, wherein
the imaging device includes a lens and a light source located rearward of the lens in the imaging direction.

10. The air processing device of claim 1, wherein
the at least one predetermined object to be imaged includes at least one of a drain pan, a drain port, a drain pump, a float switch, or a humidifying element.

11. The air processing device of claim 1, wherein
the component is a pipe.

12. The air processing device of claim 1, wherein
a heat exchanger that cools or heats air is arranged inside the casing, and
the imaging device is disposed at a portion of an air flow path inside the casing where the imaging device does not overlap the heat exchanger in a direction in which air flows.

13. The air processing device of claim 1, wherein
a lens of the imaging device faces downstream of the air flow.

* * * * *